(12) United States Patent
Jung et al.

(10) Patent No.: US 10,938,582 B2
(45) Date of Patent: Mar. 2, 2021

(54) ELECTRONIC DEVICE AND POWER CONTROL METHOD OF ELECTRONIC DEVICE

(71) Applicant: SAMSUNG ELECTRONICS CO., LTD., Suwon-si (KR)

(72) Inventors: Bu-Seop Jung, Hwaseong-si (KR);
Bum-Jib Kim, Suwon-si (KR);
Jung-Hun Lee, Suwon-si (KR);
Hye-Jung Bang, Seoul (KR); Soon-Ho Lee, Seoul (KR); Young-Kow Lee, Suwon-si (KR); Ki-Yeong Jeong, Chungcheongnam-do (KR); Nam-Ju Cho, Yongin-si (KR); Doo-Suk Kang, Suwon-si (KR); Hyuk Kang, Yongin-si (KR); Bo-Kun Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 144 days.

(21) Appl. No.: 15/619,888

(22) Filed: Jun. 12, 2017

(65) Prior Publication Data

US 2018/0041349 A1    Feb. 8, 2018

(30) Foreign Application Priority Data

Aug. 2, 2016 (KR) .................. 10-2016-0098642

(51) Int. Cl.
*H04L 12/12* (2006.01)
*G06F 1/3234* (2019.01)
(Continued)

(52) U.S. Cl.
CPC ............. *H04L 12/12* (2013.01); *G06F 1/26* (2013.01); *G06F 1/32* (2013.01); *G06F 1/325* (2013.01);
(Continued)

(58) Field of Classification Search
CPC .... H04L 12/12; H04L 12/64; H04W 52/0251; H04W 52/0274; H04W 52/287;
(Continued)

(56) References Cited

U.S. PATENT DOCUMENTS 9,241,288 B2    1/2016    Brunner
9,357,152 B2    5/2016    Griffin
(Continued)

FOREIGN PATENT DOCUMENTS

KR    10-2009-0061054    6/2009
WO    WO 2009/037624    3/2009
WO    WO 2014/121504    8/2014

*Primary Examiner* — Alex Skripnikov
*Assistant Examiner* — Sharmin Chowdhury
(74) *Attorney, Agent, or Firm* — Nixon & Vanderhye P.C.

(57) ABSTRACT

An electronic device and a power control method of an electronic device are provided. The electronic device may include: a communication circuit including a first circuit configured to perform first communication and a second circuit configured to perform second communication; a processor electrically connected to the communication circuit; and a memory electrically connected to the processor, wherein, the memory stores instructions that, when executed, cause the processor to perform operations comprising: controlling the first circuit to operate according to a first power control mode associated with the first communication, and controlling the second circuit to operate according to a second power control mode associated with the second communication when the first communication and the second communication are concurrently performed through the first circuit and the second circuit; identifying a first sleep period during which the first circuit operates in a sleep mode according to the first power control mode, and a second sleep period during which the second circuit operates in the sleep mode according to the second power control mode; and controlling the communication circuit to
(Continued)

operate in a deep sleep mode in which the communication circuit operates with power that is less than or equal to a predetermined power in a period where the first sleep period and the second sleep period coincide.

20 Claims, 15 Drawing Sheets

(51) Int. Cl.
| | |
|---|---|
| *G06F 1/3209* | (2019.01) |
| *H04W 52/02* | (2009.01) |
| *G06F 1/32* | (2019.01) |
| *H04N 21/4363* | (2011.01) |
| *H04N 21/443* | (2011.01) |
| *H04W 52/28* | (2009.01) |
| *G06F 1/26* | (2006.01) |
| *G06F 15/17* | (2006.01) |
| *H04L 12/64* | (2006.01) |
| *H04N 21/6377* | (2011.01) |
| *H04W 84/12* | (2009.01) |
| *H04W 88/06* | (2009.01) |

(52) U.S. Cl.
CPC ............ *G06F 1/3209* (2013.01); *G06F 15/17* (2013.01); *H04L 12/64* (2013.01); *H04N 21/43637* (2013.01); *H04N 21/4436* (2013.01); *H04N 21/6377* (2013.01); *H04W 52/0251* (2013.01); *H04W 52/0274* (2013.01); *H04W 52/287* (2013.01); *H04W 52/0248* (2013.01); *H04W 84/12* (2013.01); *H04W 88/06* (2013.01); *Y02D 30/70* (2020.08)

(58) Field of Classification Search
CPC . H04W 84/12; H04W 88/06; H04W 52/0248; G06F 1/32; G06F 1/325; G06F 1/3209; G06F 1/26; G06F 15/17; H04N 21/4436; H04N 21/43637; H04N 21/6377; Y02D 70/1262; Y02D 70/20; Y02D 70/14; Y02D 70/00; Y02D 70/162; Y02D 70/26; Y02D 70/22; Y02D 70/168; Y02D 70/144; Y02D 70/142; Y02D 70/1242; Y02D 70/166; Y02D 70/164; Y02D 70/10
See application file for complete search history.

(56) References Cited

U.S. PATENT DOCUMENTS

| | | | |
|---|---|---|---|
| 9,730,162 B2* | 8/2017 | Pujari | H04W 52/0235 |
| 2007/0082715 A1* | 4/2007 | Rofougaran | H04W 48/08 |
| | | | 455/574 |
| 2008/0070642 A1 | 3/2008 | Wang et al. | |
| 2011/0228862 A1* | 9/2011 | Yamashita | H04L 69/14 |
| | | | 375/259 |
| 2014/0194075 A1* | 7/2014 | Black | H04B 1/40 |
| | | | 455/77 |
| 2015/0079986 A1* | 3/2015 | Nayak | H04W 52/0229 |
| | | | 455/435.2 |
| 2015/0103663 A1* | 4/2015 | Amini | H04W 28/0215 |
| | | | 370/235 |
| 2015/0282091 A1* | 10/2015 | Lin | H04W 52/0258 |
| | | | 455/552.1 |

* cited by examiner

ELECTRONIC DEVICE AND POWER CONTROL METHOD OF ELECTRONIC DEVICE

CROSS-REFERENCE TO RELATED APPLICATION

This application is based on and claims priority under 35 U.S.C. § 119 to Korean Application Serial No. 10-2016-0098642, which was filed in the Korean Intellectual Property Office on Aug. 2, 2016, the content of which is incorporated by reference herein in its entirety.

TECHNICAL FIELD

The present disclosure relates generally to an electronic device and a method of controlling the power of a communication circuit in an electronic device.

BACKGROUND

Recently, various electronic devices have been developed to include a communication circuit that supports a plurality of communication schemes. For example, a plurality of frequency bands corresponding to a plurality of communication schemes are set for the communication circuit, or the communication circuit may include a plurality of communication circuits, each of which supports a predetermined communication scheme.

The communication scheme utilizes Wi-Fi, and may include, for example, an infrastructure mode in which an access point (AP) and electronic devices (or clients) are connected and perform communication, Wi-Fi direct that supports peer to peer (P2P) communication between electronic devices, a soft AP mode (e.g., a mobile hotspot) that enables an electronic device to perform a function of an AP in Wi-Fi, an independent basic service set (IBSS), or Wi-Fi aware or a neighbor awareness networking (NAN) for discovering an electronic device with low power.

Each communication scheme may include settings for decreasing power in order to decrease an amount of power consumed when wireless communication is performed through an electronic device.

For example, when a communication circuit included in an electronic device includes a single baseband, at least one frequency band may be supported based on a time division scheme. In this instance, a power reduction setting operation may be partially restricted.

For example, an electronic device may be configured to include a communication circuit (e.g., a dual baseband chip) to concurrently perform different communications through a plurality of frequency bands, and the communication circuit may be configured to include settings for decreasing an amount of a current consumed when the concurrent communications are performed.

SUMMARY

According to various example embodiments of the present disclosure, an electronic device and a power control method of an electronic device are provided, the electronic device may include a communication circuit including a first circuit configured to perform first communication and a second circuit configured to perform second communication; a processor electrically connected to the communication circuit; and a memory electrically connected to the processor, wherein the memory stores instructions which, when executed by the processor, cause the processor to perform operations comprising: controlling the first circuit to operate according to a first power control mode associated with the first communication, and controlling the second circuit to operate according to a second power control mode associated with the second communication when the first communication and the second communication are concurrently performed through the first circuit and the second circuit; identifying a first sleep period during which the first circuit operates in a sleep mode according to the first power control mode, and identifying a second sleep period during which the second circuit operates in the sleep mode according to the second power control mode; and controlling the communication circuit to operate in a deep sleep mode in which the communication circuit operates with power less than or equal to a predetermined power during a period in which the first sleep period and the second sleep period coincide.

According to various example embodiments of the present disclosure, an electronic device is provided, the electronic device including: a housing: a touch screen display exposed through a part of the housing; a communication circuit, comprising a Wi-Fi communication circuit included in the housing, the communication circuit including a first circuit configured to support a first frequency band and a second circuit configured to support a second frequency band; a processor electrically connected to the display and the communication circuit; and a memory electrically connected to the processor, wherein, the memory stores instructions which, when executed by the processor, cause the processor to perform operations comprising: decreasing power consumption of the first circuit during a selected period of time, using a first power save scheme; decreasing power consumption of the second circuit during a selected period of time, using a second power saving scheme, independently of the first power saving scheme; controlling a first decrease in power consumption of the communication circuit obtained by decreasing both the power consumption of the first circuit and the power consumption of the second circuit to be greater than a sum of a second decrease in the power consumption of the communication circuit obtained by decreasing only the power consumption of the first circuit and a third decrease in the power consumption of the communication circuit obtained by decreasing only the power consumption of the second circuit.

According to various example embodiments of the present disclosure, an electronic device is provided, the electronic device including: a housing; a touch screen display exposed through a part of the housing; a communication circuit comprising a Wi-Fi communication circuit included in the housing, and including a first baseband circuit and a second baseband circuit; a processor electrically connected to the display and the communication circuit; and a memory electrically connected to the processor, wherein the memory stores instructions which, when executed by the processor, cause the processor to perform operations comprising: decreasing power consumption of the first baseband circuit during a selected period of time, using a first power save scheme; and decreasing power consumption of the second baseband circuit during a selected period of time, using a second power save scheme, independently from the first power save scheme.

An electronic device and a power control method of an electronic device according to various example embodiments of the present disclosure may set a communication circuit to operate with low power without setting a low-power mode for each communication scheme by setting the power of the communication circuit in a time period in which a plurality of communication connections are set as a power control mode in common.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
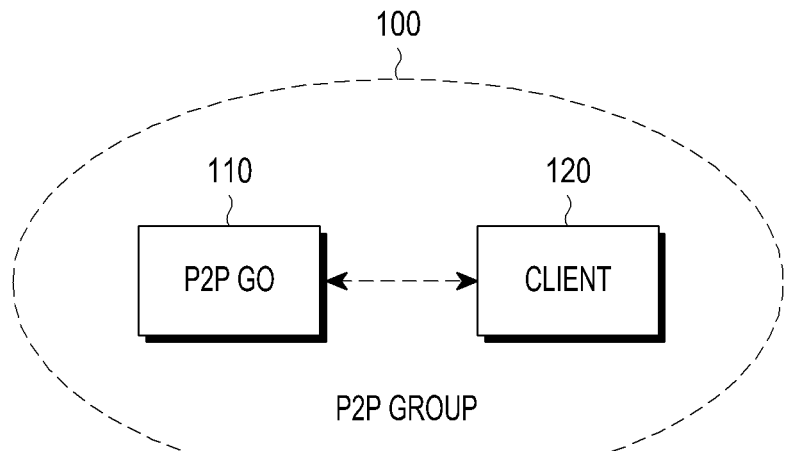
FIG. 1 is a block diagram illustrating an example of a network environment, according to various example embodiments of the present disclosure.

Hereinafter, various example embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may refer to a situation in which the device, together with other devices or components, "is able to". For example, the phrase "processor adapted (or configured) to perform A, B, and C" may refer, for example, to a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto. According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like), or the like but is not limited thereto. In various embodiments, the electronic device may be flexible, or may be a combination of one or more of the aforementioned various devices. The electronic device according to one embodiment of the present disclosure is not limited to the above described devices. In the present disclosure, the term "user" may refer to a person using an electronic device or a device (for example, an artificial intelligence electronic device) using an electronic device.

FIG. 1 is a block diagram illustrating an example of a network environment, according to various example embodiments of the present disclosure.

Referring to FIG. 1, a network environment 100 is a peer to peer (P2P) group, which includes P2P devices connected through a wireless local area network (WLAN). One of the devices of the P2P group may operate as a group owner (GO) 110, and the remaining P2P devices may operate as clients 120.

The P2P GO 110 may perform a function of an access point (AP) in the P2P group. For example, the P2P GO 110 may enable the P2P devices to perform wireless short-range communication through the P2P GO 110.

According to various embodiments of the present disclosure, the P2P group may perform wireless short-range communication through various communication connections (e.g., Wi-Fi direct, mobile hotspot, or the like), and each of the various communication connections may include various settings for low-power communication.

According to various embodiments of the present disclosure, when the P2P group is connected through Wi-Fi direct, the P2P GO 110 may reduce an amount power consumed when communication is performed, according to an opportunistic power save (OPPS) method that indicates presence to the client 120 according to a situation, or a notice of absence (NoA) method that transmits information associated with an absence timing.

For example, according to the OPPS method, a message transmitted/received between a GO and clients may be configured for an operation according to a power control mode in a situation in addition to a situation set in a standard of a communication connection. The message may be transmitted to the clients by including information informing of a period (client traffic window (CTwindow) in which the GO communicates with another client, while the GO communicates with a first client. For example, when a client that requires a data transmission is not identified after the CTwindow period, the GO may operate in a power control mode up to a predetermined point (e.g., target beacon transmission time (TBTT)).

For example, according to the NoA method, a GO transmits, to clients, a beacon and probe response including a NoA attribute. Accordingly, the NoA information (e.g., the number of repetitions, and an absence period entry point or duration) of the GO may be reported to clients. For example, the GO operates in a power control mode during a predetermined duration of time from an absence period entry point, and enters a presence period as the set absence period elapses. The GO may repeatedly enter an absence period according to the set number of repetitions.

Figure 2:
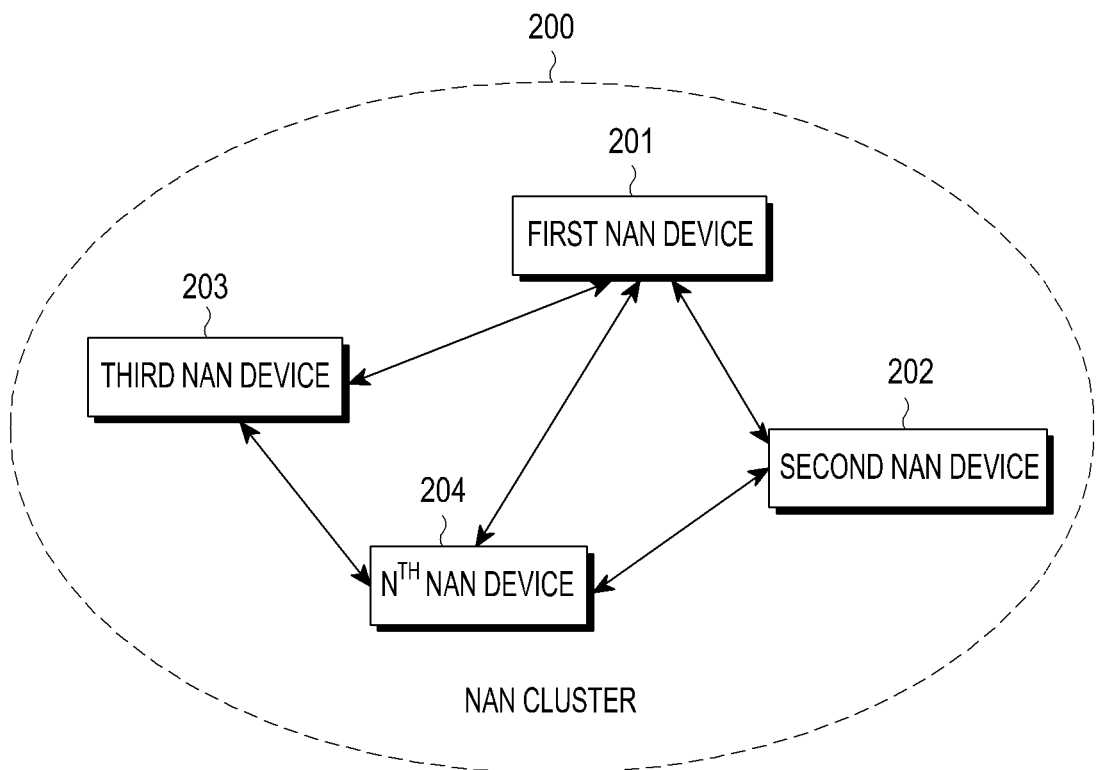
FIG. 2 is a block diagram illustrating an example of a network environment, according to various example embodiments of the present disclosure.

FIG. 2 is a block diagram illustrating an example of a network environment, according to various example embodiments of the present disclosure.

Referring to FIG. 2, a network environment 200 may include a neighborhood area network (NAN) cluster, and the NAN cluster may include a plurality of NAN devices (e.g., a first NAN device 201, a second NAN device 202, a third NAN device 203, or an $N^{th}$ NAN device 204).

According to various embodiments of the present disclosure, each of the plurality of NAN devices is time-synchronized and, thus, may transmit/receive a service discovery frame in the same time period (discovery window (DW)). Accordingly, the plurality of NAN devices may perform a scanning and advertising operation in a predetermined period, and may discover one another with low power. For example, the plurality of NAN devices transmit a beacon in the DW period to identify information associated with a device that is newly included in a NAN cluster, and may identify updated information associated with the DW.

According to various embodiments of the present disclosure, the plurality of NAN devices may transmit and receive an additional service discovery frame in an active time period that is designated between DW periods, in addition to the DW period. For example, in the active time period, an operation for connecting Wi-Fi direct, a mesh network for connecting the plurality of NAN devices, IBSS, and WLAN may be performed, or a legacy Wi-Fi connection or discovery may be performed, in addition to an additional service discovery. Additionally, a NAN data link (NDL) function for transmitting/receiving data between NAN devices may be performed without a separate connection topology.

According to various embodiments of the present disclosure, the first NAN device 201 may include two basebands, and may perform dual-communication (e.g., dual Wi-Fi) that concurrently support two different communication connections (e.g., Wi-Fi and Wi-Fi direct) through the respective basebands. For example, although two basebands are used in the descriptions, a larger number of basebands may be included. Each communication connection may be performed through at least one baseband.

According to various embodiments of the present disclosure, a P2P GO device (e.g., the first NAN device 201) out of the plurality of NAN devices may be determined. For example, the first NAN device 201 may perform Wi-Fi communication, and may perform communication with the NAN devices based on the Wi-Fi communication.

Figure 3A:
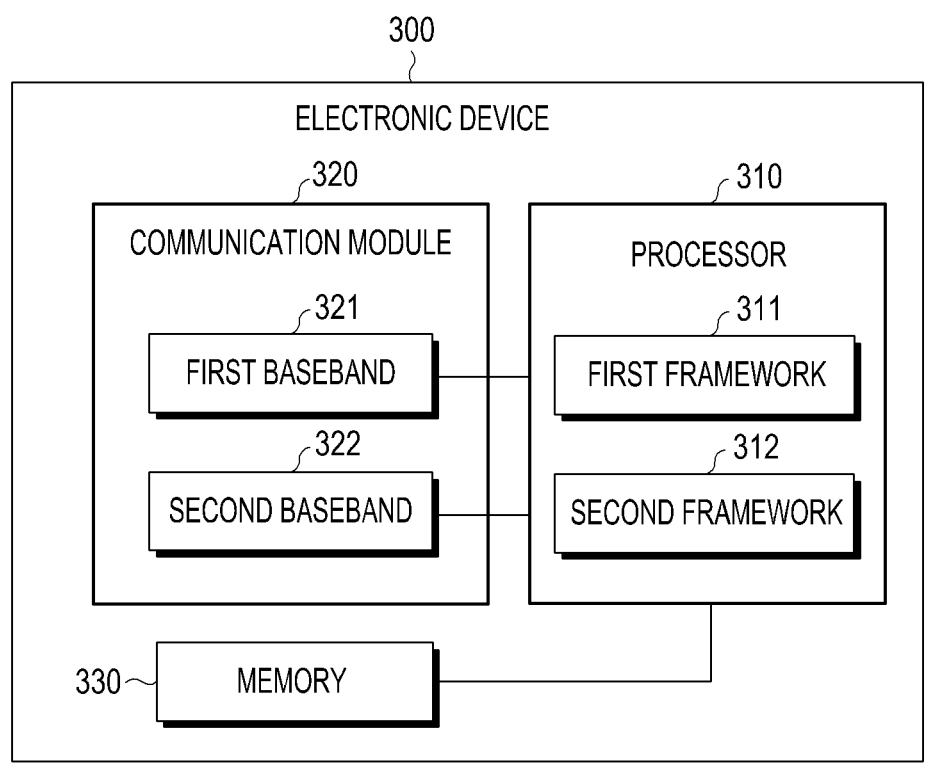
FIGS. 3A and 3B are block diagrams illustrating various examples of a configuration of an electronic device according to various example embodiments of the present disclosure.
Figure 3B:
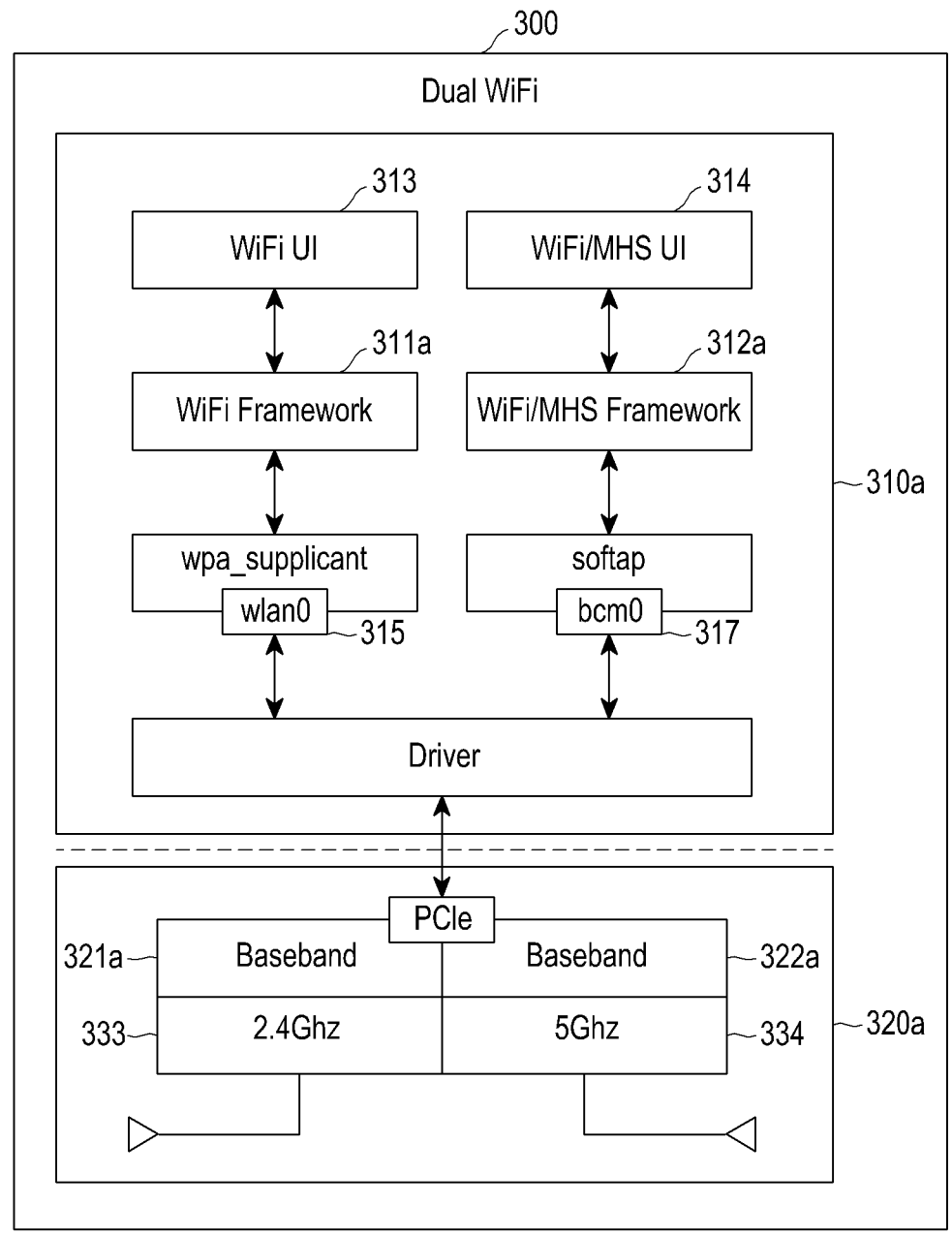

FIGS. 3A and 3B are block diagrams illustrating various examples of a configuration of an electronic device according to various example embodiments of the present disclosure.

Referring to FIG. 3A, an electronic device 300 may include a processor (e.g., including processing circuitry) 310, a communication circuit (e.g., a communication module 320), and a memory 330.

The processor 310 may include a first framework 311 and a second framework 312, and may control general operations of the electronic device 300.

According to various embodiments of the present disclosure, the processor 310 may include various processing circuitry and control the operations of the electronic device 300. For example, the processor 310 may control the first framework 311 and the second framework 312. For example, each of the first framework 311 and the second framework 312 may be electrically connected with a baseband (e.g., a first baseband 321 and a second baseband 322) of the communication module 320, and may include various circuitry and/or program elements that control the communication module 320 to perform communication through a frequency band allocated to a connected baseband.

Although it is illustrated that two frameworks are used according to various embodiments of the present disclosure, some of the frameworks may be omitted or a larger number of frameworks may be included according to a type of communication connection supported by the communication module 320.

According to various embodiments of the present disclosure, when a dual communication connection is performed through the communication module 320, the processor 310 may control the communication module 320 to operate according to a power control mode set in the standard of each communication connection.

The communication module 320 may include various communication circuitry, including, for example, and without limitation, the first baseband (or a first circuit) 321 and the second baseband (or a second circuit) 322, and may perform communication through at least some of the channels of a frequency band (e.g., 2.4 GHz, 5 GHz, or 60 GHz) allocated to each baseband. For example, the communication module 320 may perform communication associated with a first communication scheme (e.g., legacy Wi-Fi) and a second communication scheme (e.g., Wi-Fi direct) in different channels among the channels of a frequency band allocated to a single baseband, or may perform a dual-communication connection that concurrently performs different communication connections in multiple basebands.

According to various embodiments of the present disclosure, when frequency bands allocated to respective basebands are the same, the processor 310 may change one out of a first frequency band allocated to the first baseband 321 and a second frequency band allocated to the second baseband 322, to a third frequency band that does not overlap the first frequency band and the second frequency band. For example, the processor 310 may set at least some channels of the first frequency band to be different from at least some channels of the second frequency band, and thus, may control the first communication and the second communication to be performed through different channels.

Although it is illustrated that two basebands are used according to various embodiments of the present disclosure, a larger number of basebands may be included, and various communication connections may be concurrently performed according to the number of basebands included in the communication module 320.

According to various embodiments of the present disclosure, when communication of a first communication scheme (e.g., Wi-Fi) is triggered through the first baseband 321 and communication of a second communication scheme (e.g., Wi-Fi direct) is triggered through the second baseband 322 in the communication module 320, the first framework 311 may control a first communication connection to be performed according to a first power control mode, and the second framework 312 may control a second communication connection to be performed according to a second power control mode. According to various embodiments of the present disclosure, each power control mode may control the communication module 320 to operate in an active mode and a sleep mode in a period repeated in a predetermined cycle. The power control mode may be operated under the control of the first framework 311 and the second framework 312 of the processor 310, or may be operated under the control of the communication module 320 based on logic set in each baseband.

For example, a duration time, a start point, the number of repetitions of each period, or the like of the power control mode may be set by agreement between the electronic device 300 and other communication devices, or may be designated in advance for a predetermined communication scheme by a manufacturer.

According to various embodiments of the present disclosure, the processor 310 may identify an overlap period in which the first communication connection according to the first communication scheme and the second communication connection according to the second communication scheme concurrently operate in a sleep mode. For example, the processor 310 may control the communication module 320 to operate in a deep sleep mode in the overlap period.

According to various embodiments of the present disclosure, in the deep sleep mode, the communication module 320 may be set to operate with a smaller amount of power than the sum of an amount of power consumed by an operation according to a first power control mode and an amount of power consumed by an operation according to a second power control mode. For example, in the deep sleep mode, the communication module 320 may be set to operate elements (e.g., an RF module (not illustrated)) remaining after excluding at least some elements of the communication module 320 as a stopped state so that the communication module 320 interrupts a transmitting/receiving operation during a predetermined period of time.

According to various embodiments of the present disclosure, the electronic device 300 may include a communication circuit (e.g., the communication circuit 320) including a first circuit that performs first communication and a second circuit that performs second communication, a processor 310 electrically connected to the communication circuit, and a memory electrically connected to the processor, wherein, in an execution, the memory 330 stores instructions which, when executed by the processor, cause the processor to perform operations comprising: controlling the first circuit to operate according to a first power control mode associated with the first communication, and controlling the second circuit to operate according to a second power control mode associated with the second communication when the first communication and the second communication are concurrently performed through the first circuit and the second circuit; identifying a first sleep period in which the first circuit operates in a sleep mode according to the first power control mode, and a second sleep period in which the second circuit operates in the sleep mode according to the second power control mode; and controlling the communication circuit to operate in a deep sleep mode in which the communication circuit operates with power less than or equal to a predetermined power in a period where the first sleep period and the second sleep period coincide.

According to various embodiments of the present disclosure, the instructions may be set to cause the processor to control the communication circuit so that the first communication is performed using at least some channels of a first frequency band allocated to the first circuit, and the second communication is performed using at least some channels of a second frequency band allocated to the second circuit.

According to various embodiments of the present disclosure, when the first frequency band and the second frequency band are the same, the instructions may be set to enable the processor to change one of the first frequency band allocated to the first circuit and the second frequency band allocated to the second circuit to a third frequency band that does not overlap the first frequency band and the second frequency band.

According to various embodiments of the present disclosure, the instructions may be set to cause the processor to perform operations including: determining whether the first circuit or the second circuit is temporarily or continuously usable, or whether an external device connected through the first communication or the second communication supports the third frequency band; and changing one of the first frequency band and the second frequency band to the third frequency band based on at least some of the determination.

According to various embodiments of the present disclosure, when the first frequency band and the second frequency band are the same, the instructions may enable the processor to set at least some channels of the first frequency band allocated to the first circuit to be different from at least some channels of the second frequency band allocated to the second circuit.

According to various embodiments of the present disclosure, the first communication or the second communication may be at least one of Wi-Fi, Wi-Fi direct, legacy Wi-Fi, and a mobile hotspot.

According to various embodiments of the present disclosure, the instructions may be set to cause the processor to transmit property information associated with the first power control mode to a first external device so that the first external device connected through the first communication operates according to the first power control mode.

According to various embodiments of the present disclosure, the property information associated with the first power control mode may include at least some of a size of an active period, a size of a sleep period, and a number of repetitions of each period.

According to various embodiments of the present disclosure, the instructions may be set to cause the processor to perform operations comprising: receiving information associated with a power control mode operating in a first external device, from the first external device connected through the first communication; and changing the first power control mode set in the first circuit based on at least some of the received information.

According to various embodiments of the present disclosure, the instructions may be set to cause the processor to change property information associated with the first power control mode or the second power control mode based on at least some of a comparison of communication speeds between the first communication and the second communication.

According to various embodiments of the present disclosure, the instructions may be set to cause the processor to perform operations comprising: identifying data received in the first sleep period or the second sleep period; and controlling the first circuit and the second circuit to not operate in an active mode by being released from the first sleep period or the second sleep period, when the received data is a predetermined type of data, or an amount of received data does not exceed a predetermined amount of data.

According to various embodiments of the present disclosure, a frequency band allocated to the first circuit and the second circuit may be one of 2.4 GHz, 5 GHz, and 60 GHz.

According to various embodiments of the present disclosure, an electronic device (e.g., the electronic device 300) may include a housing, a touch screen display exposed through a part of the housing, a communication circuit, which is a Wi-Fi communication circuit included in the housing, and includes a first circuit (e.g., the first baseband 321) that supports a first frequency band and a second circuit (e.g., the second baseband 322) that supports a second frequency band, a processor electrically connected to the display and the communication circuit, and a memory (e.g., the memory 330) electrically connected to the processor, wherein, the memory stores instructions which, when executed by the processor, cause the processor to perform operations comprising: decreasing power consumption of the first circuit during a selected period of time, using a first power save scheme; decreasing power consumption of the second circuit during a selected period of time, using a second power saving scheme, independently from the first power saving scheme; controlling a first decrease in power consumption of the communication circuit obtained by decreasing both the power consumption of the first circuit and the power consumption of the second circuit to be greater than a sum of a second decrease in the power consumption of the communication circuit obtained by decreasing only the power consumption of the first circuit and a third decrease in the power consumption of the communication circuit obtained by decreasing only the power consumption of the second circuit.

According to various embodiments of the present disclosure, the instructions may be set to cause the processor to control the communication circuit so that first communication is performed using at least some channels of the first frequency band and second communication is performed using at least some channels of the second frequency band.

According to various embodiments of the present disclosure, when the first frequency band and the second frequency band are the same, the instructions may be set to enable the processor to change one of the first frequency band allocated to the first circuit and the second frequency band allocated to the second circuit to a third frequency band that does not overlap the first frequency band and the second frequency band.

According to various embodiments of the present disclosure, when the first frequency band and the second frequency band are the same, the instructions may enable the processor to set at least some channels of the first frequency band allocated to the first circuit to be different from at least some channels of the second frequency band allocated to the second circuit.

According to various embodiments of the present disclosure, the instructions may be set to cause the processor to transmit property information associated with the first power control mode to a first external device so that the first external device connected through first communication operates according to the first power control mode.

According to various embodiments of the present disclosure, the property information associated with the first power control mode may include at least some of a size of an active period, a size of a sleep period, and a number of repetitions of each period, and property information associated with the first power control mode or the second power control mode may be set to be changed based on at least some of a comparison of communication speeds between the first communication and second communication.

According to various embodiments of the present disclosure, the instructions may be set to cause the processor to perform operations comprising: receiving information associated with a power control mode operating in a first external device, from the first external device connected through first communication; and changing the first power control mode set in the first circuit based on at least some of the received information.

According to various embodiments of the present disclosure, an electronic device (e.g., the electronic device 300) may include a housing, a touch screen display exposed through a part of the housing, a communication circuit that is a Wi-Fi communication circuit included in the housing, and includes a first baseband circuit (e.g., the first baseband 321) and a second baseband circuit (e.g., the second baseband 322), a processor electrically connected to the display and the communication circuit, and a memory (e.g., the memory 330) electrically connected to the processor, wherein the memory stores instructions which, when executed by the processor, cause the processor to perform operations comprising: decreasing power consumption of the first baseband circuit during a selected period of time, using a first power save scheme; and decreasing power consumption of the second baseband circuit during a selected period of time, using a second power save scheme, independently from the first power save scheme.

Referring to FIG. 3B, the electronic device 300 may include an application processor (AP) layer 310a (or the processor 310) and a Wi-Fi chip layer 320a (or the communication module (e.g., including communication circuitry) 320).

According to various embodiments of the present disclosure, the electronic device 300 may perform dual-Wi-Fi communication that concurrently performs two wireless short-range communications through corresponding frequency bands, based on two communicable frequency bands (e.g., 2.4 GHz (e.g., 2.412 GHz~2.484 GHz), 5 GHz (e.g., 5.170 GHz~5.835 GHz), or 60 GHz (e.g., 57.24 GHz~65.88 GHz)).

In the dual-Wi-Fi scheme, in the configuration of the electronic device 300, the AP layer 310a may include a Wi-Fi UI 313 and a Wi-Fi/MHS UI 314, and may include a Wi-Fi Framework 311a (e.g., the first framework 311) that communicates with the Wi-Fi UI 313 and a Wi-Fi/MHS Framework 312a (e.g., the second framework 312) that communicates with the Wi-Fi/MHS UI 314. The AP layer 310a may include wpa_supplicant and softap, which authenticate a Wi-Fi connection of an electronic device.

According to various embodiments of the present disclosure, in the dual Wi-Fi scheme, wpa_supplicant may be managed as a WLAN named wlan0 315, and softap may be managed as another WLAN named bcm0 317. For example, in the dual Wi-Fi scheme, the AP layer 310a may utilize Wi-Fi UI 313 and the Wi-Fi/MHS UI 314, separately. The AP layer 310a may include a driver, and may communicate with the Wi-Fi chip layer 320a through the driver.

The Wi-Fi chip layer 320a may communicate with a driver of the AP layer 310a through a peripheral component interconnect express (PCIe), and may use two basebands 321a and 322a. For example, in the dual Wi-Fi scheme, the Wi-Fi chip layer 320a may use respective Wi-Fi frequency bands (e.g., a 2.4 GHz frequency band 333 and a 5 GHz frequency band 334) by separately utilizing two basebands 321a and 322a.

According to various embodiments of the present disclosure, the Wi-Fi chip layer 320a may perform communication by respectively utilizing wireless short-range communication corresponding to the 2.4 GHz frequency band 333 and wireless short-range communication corresponding to the 5 GHz frequency band 334, by request from a user or an application. For example, the wireless short-range communication may be performed through at least one channel, which is determined as a usable frequency by dividing a predetermined frequency band (the 2.4 GHz frequency band 333, the 5 GHz frequency band 334, or 60 GHz) by a predetermined frequency interval. For example, in Wi-Fi communication, channels may exist at intervals of 5 GHz from 2412 GHz to 2484 GHz in the 2.4 GHz frequency band 333. Channels may exist at intervals of 10 or 20 GHz from 5180 GHz to 5825 GHz in the 5 GHz frequency band 334. Channels may exist at intervals of 2.16 Hz from 57.24 GHz to 65.88 GHz in the 60 GHz frequency band.

An electronic device according to various embodiments of the present disclosure may concurrently perform Wi-Fi communication and MHS communication by respectively utilizing two frequency bands (e.g., the 2.4 GHz frequency band 333 and the 5 GHz frequency band 334) in the dual-Wi-Fi scheme. For example, the electronic device may perform the Wi-Fi communication in the 2.4 GHz frequency band 333, and may perform MHS communication in the 5 GHz frequency band 334.

The electronic device according to various embodiments of the present disclosure may utilize the Wi-Fi communication based on the 2.4 GHz frequency band 333, when providing MHS communication (service) to other electronic devices based on the 5 GHz frequency band 334. The electronic device that supports the dual-Wi-Fi scheme use the wlan0 315 that supports wpa_supplicant and the bcm0 317 that supports softap, respectively, and thus, the electronic device may perform Wi-Fi communication through the 2.4 GHz frequency band 333 and may perform MHS communication through the 5 GHz frequency band 334. The electronic device may concurrently utilize the two wireless short-range communications (Wi-Fi communication and MHS communication).

Figure 4:
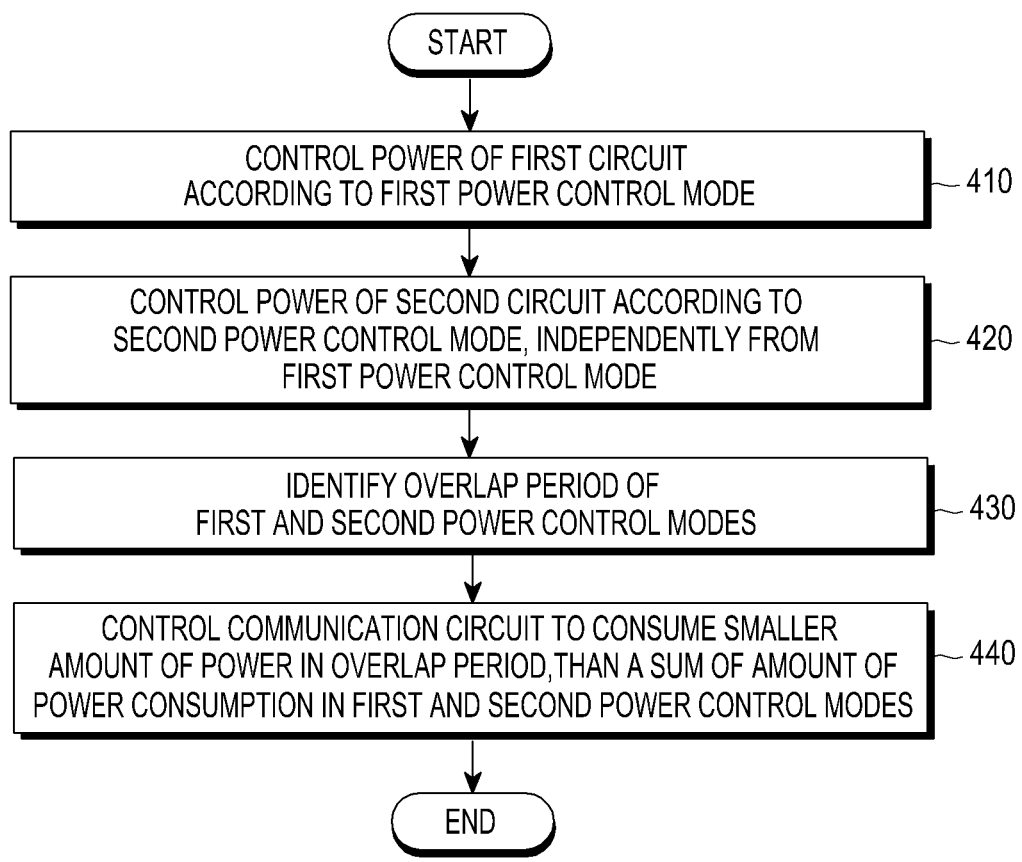
FIG. 4 is a flowchart illustrating an example of an operation of controlling power in an electronic device according to various example embodiments of the present disclosure.

FIG. 4 is a flowchart illustrating an example of an operation of controlling power in an electronic device according to various example embodiments of the present disclosure.

Referring to FIG. 4, according to various embodiments of the present disclosure, an electronic device performs a power control operation of a first circuit according to a first power control mode in operation 410. For example, when first communication is performed using a first communication scheme (e.g., Wi-Fi) through the first circuit of a communication circuit, the electronic device may control power of the first circuit according to the first power control mode. For example, the first communication may operate in a station mode in which a predetermined device is designated to perform the role of an access point (AP).

According to various embodiments of the present disclosure, while the electronic device operates in the station mode, when it is determined that data communication does not occur during a predetermined period of time, through a baseband that takes charge of the first communication or through a first framework connected thereto, the electronic device transmits a message indicating entry to a first power control mode to an AP in the station mode, and may enter the first power control mode. For example, as the electronic device operates according to the first power control mode, the electronic device receives a beacon periodically transmitted from the AP in an active period, and may operate in a sleep mode in the rest periods excluding the active period.

According to various embodiments of the present disclosure, the electronic device performs a power control operation of a second circuit according to a second power control mode, independently from the first power control mode in operation 420. For example, when second communication is performed using a second communication scheme (e.g., Wi-Fi direct) through the second circuit of the communication circuit, at the same time as the first communication, the electronic device may control the power of the second circuit according to the second power control mode (e.g., NoA method). For example, the electronic device may transmit at least some of the information associated with NoA to external devices according to the NoA method. For example, the electronic device may transmit, to the external devices, information associated with a period in which the electronic device enters a sleep mode, and may control the second circuit to operate in the sleep mode in the corresponding period.

According to various embodiments of the present disclosure, the electronic device may measure the power of the first circuit and the second circuit, and may designate values indicating power control states based on the measured power values. For example, the power control state may include various information indicating a power control state of a communication circuit, for example, whether each circuit operates according to a power control mode, whether an electronic device enters an active period or a sleep period, time information associated with each period (e.g., a duration or a repetition cycle of a period), and the like.

According to various embodiments of the present disclosure, the electronic device identifies an overlap period in which a first power control mode and a second power control mode operate, in operation 430. For example, the electronic device may identify a first sleep period in which the first circuit operates in a sleep mode as the first communication operates according to the first power control mode, and a second sleep period in which the second circuit operates in the sleep mode as the second communication operates according to the second power control mode, and may identify an overlap period in which the first sleep period and the second sleep period operate in the sleep mode in common. For example, the electronic device may determine a period in which the first circuit and the second circuit concurrently operate in a sleep mode based on at least some of information associated with the first power control mode and/or the second power control mode. For example, the electronic device measures an amount of power of the first circuit and the second circuit, and when an amount of power of the communication circuits in a predetermined period is less than or equal to a predetermined value, the electronic device may determine the period as the overlap period in which the first circuit and the second circuit operate in the sleep mode in common.

According to various embodiments of the present disclosure, the electronic device controls a communication circuit to consume a smaller amount of power in the common period than the sum of an amount of power consumed in the first power control mode and an amount of power consumed in the second power control mode in operation 440. For example, the electronic device may set the communication circuit to operate in a deep sleep mode in the common period in which the electronic device operates in the sleep mode in common in the first sleep period and the second sleep period. For example, as the communication circuit operates in the deep sleep mode, a data transmitting/receiving operation is interrupted in the communication circuit during a predetermined period of time, and the communication circuit is set to consume an amount of power, which is less than an amount of power consumed in the first circuit and the second circuit which operate in the sleep mode.

According to various embodiments of the present disclosure, in the deep sleep mode, the electronic device may control the communication circuit to enable a decrease (C) in power consumption of the communication circuit obtained by decreasing an amount of power consumed by both the first circuit and the second circuit to be greater (C>A+B) than the sum of a decrease (A) in power consumption of the communication circuit obtained by decreasing only an amount of power consumed by the first circuit and a decrease (B) in power consumption of the communication circuit obtained by decreasing only an amount of power consumed by the second circuit. For example, as the electronic device operates in the deep sleep mode, the electronic device may operate elements (e.g., an RF module) remaining after excluding at least some of the elements of the communication circuit as a stopped state, so that a transmitting/receiving operation is interrupted during a predetermined period of time.

Figure 5:
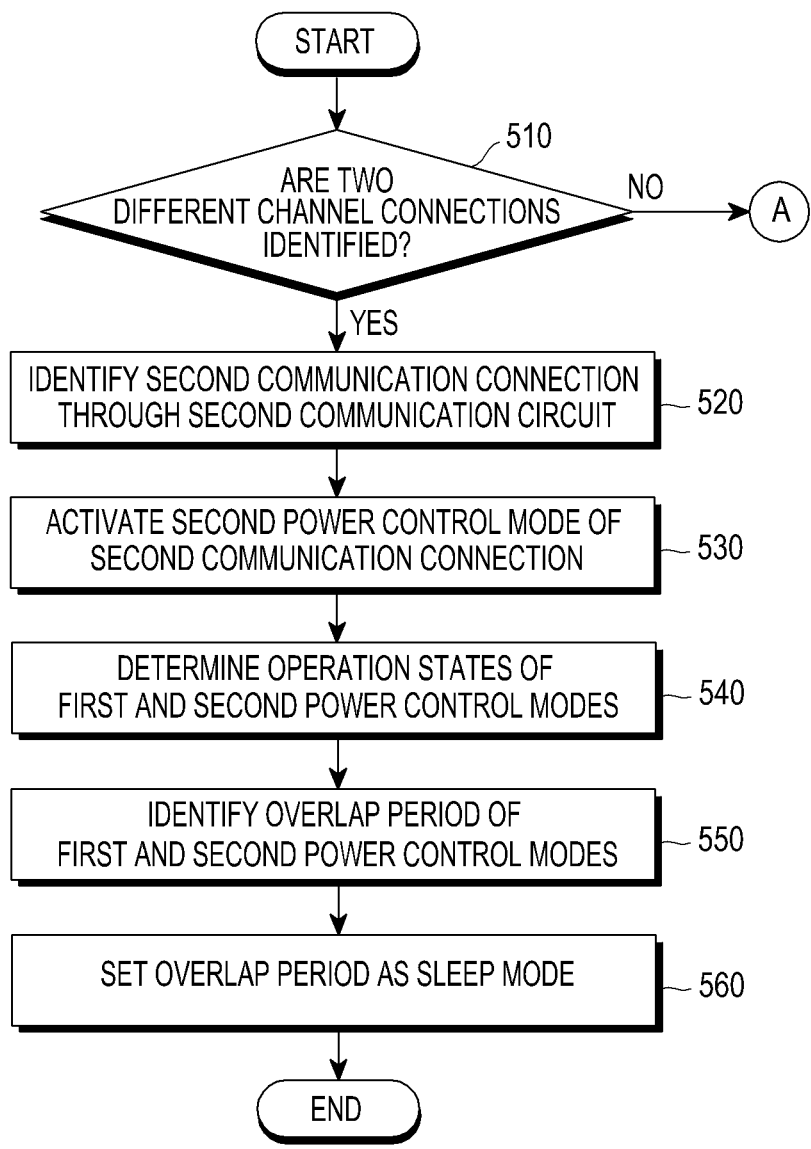
FIG. 5 is a flowchart illustrating an example of an operation of controlling power in an electronic device including a communication circuit that supports a plurality of communication connections according to various example embodiments of the present disclosure.

FIG. 5 is a flowchart illustrating an example of an operation of controlling power in an electronic device including a communication circuit that supports a plurality of communication connections according to various example embodiments of the present disclosure.

According to various embodiments of the present disclosure, a communication circuit of an electronic device may include a first circuit and a second circuit, and when a first communication connection (e.g., Wi-Fi) is performed through the first circuit, the electronic device may control the first circuit to operate according to a first power control mode associated with the first communication connection.

Referring to FIG. 5, according to various embodiments of the present disclosure, the electronic device determines whether two different channel connections are identified in operation 510. For example, the electronic device determines whether dual communication connections (e.g., a first communication connection and a second communication connection) that are concurrently performed in a communication circuit correspond to communication connections through different channels in operation 510. For example, when channels of the first communication connection and the second communication connection are set as different frequency bands, the electronic device may determine that the dual communication connections are performed through different channels, respectively.

Although it is illustrated that different channels are set through different frequency bands according to various embodiments of the present disclosure, the different channels may be configured within a single frequency band. For example, when the dual communication connection is performed, each of the channels configured in the single frequency band may be configured at regular intervals of at least a predetermined value to prevent interference from occurring between antennas that perform the dual-communication connection.

When a result of operation 510 shows that the plurality of communication connections are communication connections through different channels, the electronic device according to various embodiments of the present disclosure identifies a second communication connection through a second communication circuit in operation 520. For example, the electronic device may identify the second communication connection through the second circuit of the communication circuit. When a result of operation 510 shows that a plurality of communication connections are performed in the same channel through the communication circuit of the electronic device, the electronic device may proceed to "A" and perform operation 740 (see, e.g., FIG. 7 below).

According to various embodiments of the present disclosure, the electronic device performs a second power control mode activating operation for the second communication connection in operation 530. For example, according to the second power control mode (e.g., OOPS method), a data transmission/reception through the second communication connection may be set to be performed only in a predetermined time period.

Although it is illustrated that the second power control mode is activated for the second connection according to various embodiments of the present disclosure, operation 530 for activating a power control mode may be omitted in the case of a communication connection (e.g., NAN communication) in which an active period and a sleep period are set to be repeated in advance, from among the communication connection schemes.

According to various embodiments of the present disclosure, the electronic device may determine data communication and termination of a dual communication connection. For example, the electronic device may determine that data communication through the first communication connection and the second communication connection is performed and the data communication is terminated. For example, when the data communication does not occur during a predetermined period of time, or the electronic device enters a predetermined period (e.g., an absence period), the electronic device may determine that the data communication is terminated.

According to various embodiments of the present disclosure, the electronic device determines operation states of the first circuit and the second circuit in the first power control mode and the second power control mode in operation 540. For example, each power control mode is set to enable a corresponding circuit to operate in an active mode or a sleep mode in a repeated period set in advance. The electronic device may determine whether each circuit operates in an active mode or a sleep mode at a predetermined point.

According to various embodiments of the present disclosure, the electronic device may identify an overlap period in which the first circuit and the second circuit operate in the sleep mode in common, in operation 550. For example, the first circuit and the second circuit may be set to operate with less power than that of a predetermined mode (e.g., a standby mode), or may be set to operate with power that is less than or equal to a predetermined value, in the sleep mode.

According to various embodiments of the present disclosure, the electronic device may set the first circuit and the second circuit to operate in a deep sleep mode in the overlap period, in operation 560.

Figure 6:
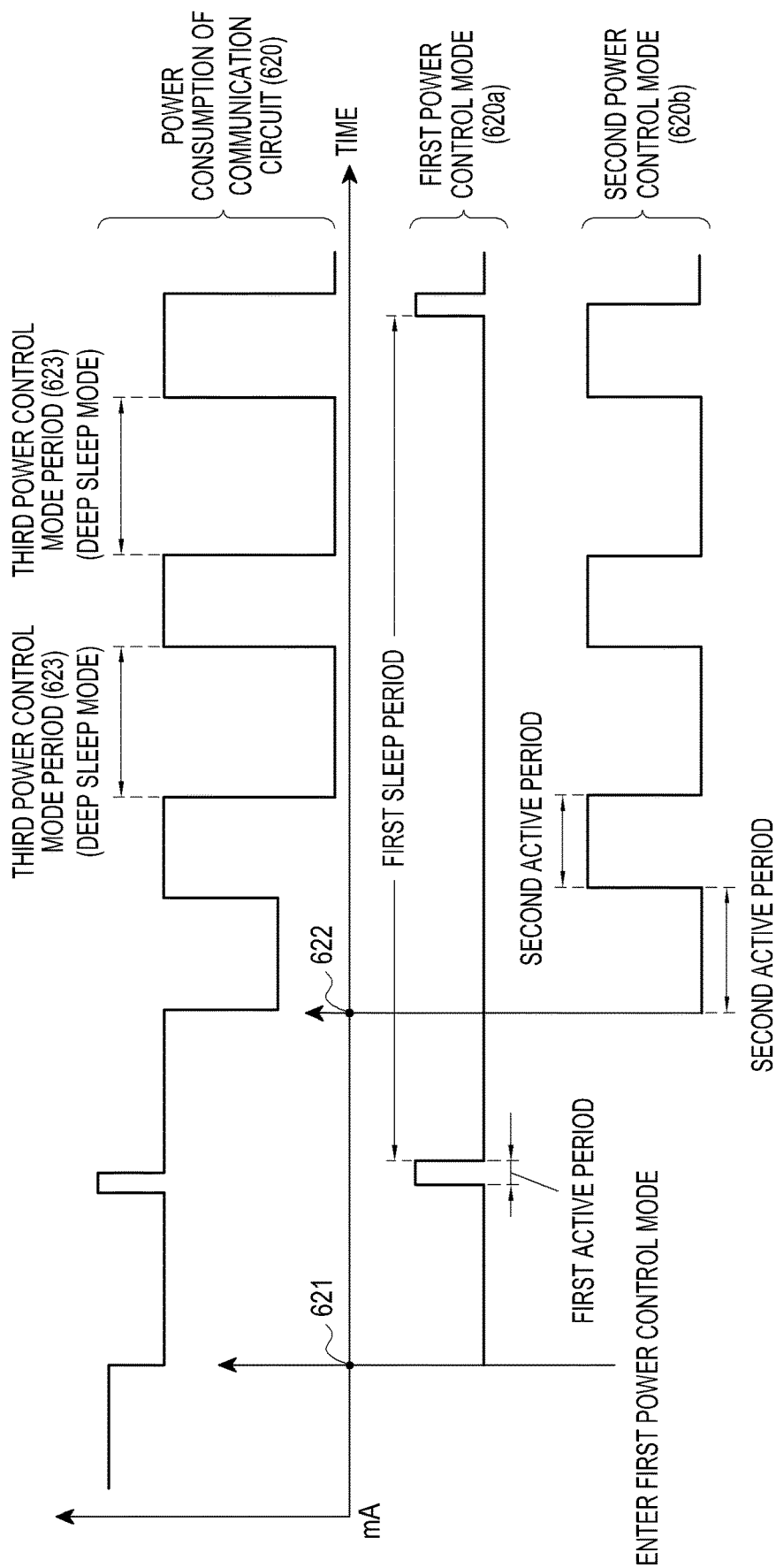
FIG. 6 is a timing diagram illustrating an example of an active period and a sleep period according to each power control mode in an electronic device including a plurality of communication circuits according to various example embodiments of the present disclosure.

FIG. 6 is a timing diagram illustrating an example of an active period and a sleep period according to each power control mode in an electronic device including a plurality of communication circuits according to various example embodiments of the present disclosure.

Referring to FIG. 6, the timing diagram illustrates an active period and a sleep period according to various power control modes, and a change in an amount of current consumed according to each power control mode. For example, each power control mode may be set to enable a corresponding communication circuit to operate in an active mode or a sleep mode in a period that is repeated a predetermined number of times or that continues during a duration, according to a communication scheme.

According to various embodiments of the present disclosure, the electronic device may include a communication circuit that includes a first circuit and a second circuit. A first communication connection of a first communication scheme is performed through the first circuit, and a second communication connection of a second communication scheme, which is different from the first communication scheme, may be performed through the second circuit, at the same time as the first communication connection. For example, as the first and second communication connections are performed, the communication circuit may operate according to the power control modes associated with the respective communication schemes.

Although it is illustrated that each of the first communication connection and the second communication connection is performed through a single circuit according to various embodiments of the present disclosure, each may be performed through a plurality of circuits. For example, a single communication connection may be performed through a part of a channel of the first circuit and a part of a channel of the second circuit.

According to various embodiments of the present disclosure, the electronic device may perform control to enable the first circuit to operate according to a first power control mode at a first point 621. In a communication period 620a of the first power control mode, a first active period in which the first circuit operates in an active mode and a first sleep period in which the first circuit operates in a sleep mode may be repeated.

According to various embodiments of the present disclosure, the electronic device may perform control to enable the second circuit to operate according to a second power control mode at a second point 622. In a communication period 620b of the second power control mode, a second active period and a second sleep period may be repeated.

According to various embodiments of the present disclosure, the electronic device may identify an overlap period 623 from the first sleep period of the first circuit and the second sleep period of the second circuit. For example, the overlap period may include a period in which the first circuit and the second circuit operate in the sleep mode in common.

According to various embodiments of the present disclosure, the electronic device may set a communication circuit to operate according to a third power control mode (e.g., a deep sleep mode) in the overlap period 623. For example, in the third power control mode, the communication circuit may be set to operate elements (e.g., an RF module (not illustrated)) remaining after excluding at least some elements of the communication circuit as a stopped state so that a transmitting/receiving operation is interrupted during a predetermined period of time in the communication circuit.

According to various embodiments of the present disclosure, as the communication circuit of the electronic device operates in a deep sleep mode in the overlap period 623, the communication circuit may drive with power consumption 620, which is less than an amount power consumed in the first sleep period of the first circuit and the second sleep period of the second circuit.

Figure 7:
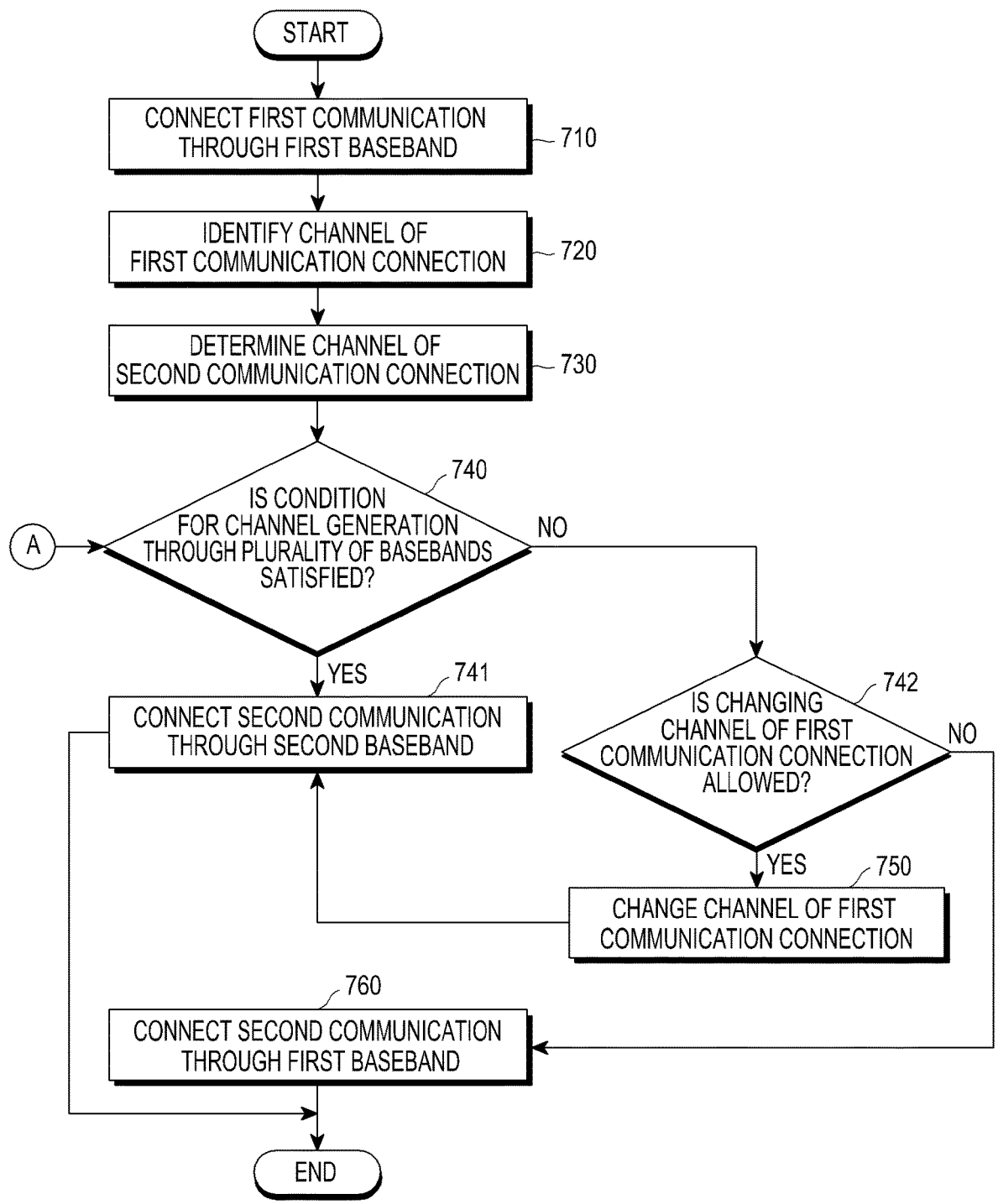
FIG. 7 is a flowchart illustrating an example of an operation of controlling power in an electronic device including a communication circuit that supports a plurality of communication connections according to various example embodiments of the present disclosure.

FIG. 7 is a flowchart illustrating an example of an operation of controlling power in an electronic device including a communication circuit that supports a plurality of communication connections according to various example embodiments of the present disclosure.

Referring to FIG. 7, according to various embodiments of the present disclosure, an electronic device identifies a first communication connection that is performed through a first baseband of a communication circuit in operation 710.

According to various embodiments of the present disclosure, the electronic device identifies a first channel of the first communication connection in operation 720. For example, the first channel may be set as at least some (e.g., channel 1 of the 2.4 GHz band) of a frequency band set for the first baseband (e.g., 2.4 GHz).

According to various embodiments of the present disclosure, the electronic device may determine whether a communication connection (e.g., a second communication connection) of a scheme different from the first communication connection is performed through the communication circuit.

According to various embodiments of the present disclosure, the electronic device determines a second channel of the second communication connection, which is performed through the communication circuit, in operation 730.

According to various embodiments of the present disclosure, as the second communication connection (e.g., Wi-Fi direct) is performed after the first communication connection (Wi-Fi), the electronic device may determine the second channel of the second communication connection based on the first channel of the first communication connection. For example, the second channel is a band of at least a predetermined interval from the first channel, and may be set to a value different from the first channel or may be designated by a predetermined electronic device (e.g., P2P GO) when the second communication connection is established.

According to various embodiments of the present disclosure, the electronic device determines whether each of the first channel and the second channel satisfies a condition for generation through multiple basebands in operation 740. For example, when a result of operation 510 shows that a plurality of communication connections are performed in the same channel through the communication circuit of the electronic device, the electronic device may perform operation 740.

According to various embodiments of the present disclosure, when first communication is available through only a designated channel as the first communication connection (e.g., Wi-Fi) operates in a station mode, changing the first channel may not be allowed. As the second communication connection (e.g., Wi-Fi direct) operates in the P2P GO mode, the second channel may be separated as a channel that is different from the first channel through agreement with another electronic device. For example, a channel separable from the first baseband, from among the first channel and the second channel, may satisfy a condition for channel generation through multiple basebands.

According to various embodiments of the present disclosure, when a result of operation 740 does not satisfy the condition for channel generation through multiple basebands, the electronic device determines whether the first channel of the first communication connection is changeable in operation 742.

According to various embodiments of the present disclosure, the first channel of the first communication connection operates in a station mode that designates a predetermined device to perform the role of an AP, and thus, changing the channel in the first communication area may not be allowed. For example, as the first communication connection roams to another AP, which is different from the AP, the first channel may be changed to a channel in another band, or a frequency band of the first communication may be changed to a second frequency band allocated to the second baseband, and the first channel may be changed to a channel, which is different from the second channel, from among the channels of the second frequency band, and thus, the first channel and the second channel may be set to be different.

According to various embodiments of the present disclosure, changing the second channel of the second communication connection may be allowed since an electronic device that is to perform the role of the AP operates in the P2P GO mode which allows changing. For example, as the P2P GO out of the devices connected to the second communication, which is Wi-Fi direct, performs an extended channel switch announcement (ECSA), the channel of the second communication connection may be set to be different from the first channel.

According to various embodiments of the present disclosure, when the first communication corresponding to Wi-Fi direct and the second connection corresponding to the station mode are concurrently performed in the electronic device, the electronic device may determine to change the first channel of the first communication. In this instance, a changed first channel may be set to be different from the second channel.

According to various embodiments of the present disclosure, when a result of operation 742 shows that changing of the first channel is allowed, the electronic device may change the first channel to another channel in operation 750.

According to various embodiments of the present disclosure, when a result of operation 742 shows that changing of the first channel is not allowed, the electronic device may perform the second communication through the second channel in the first baseband in operation 760. For example, the second channel is a channel in which the second communication is performed, and some channels of a frequency band allocated to the first baseband may be set as the second channel.

According to various embodiments of the present disclosure, when a result of operation 740 shows that the condition for channel generation through multiple basebands is satisfied, or when operation 750 is performed, the electronic device generates a second channel through each of the multiple basebands and connects the second communication in operation 741.

According to various embodiments of the present disclosure, a first frequency band and a second frequency band, which are different from each other, may be allocated to the multiple basebands, and at least some channels of a frequency band allocated to the second baseband may be set as the second channel. For example, as the first channel and the second channel are changed to channels of different basebands, the first communication connection and the second communication connection may be performed concurrently through the first channel and the second channel of different frequency bands.

According to various embodiments of the present disclosure, as the first communication connection and the second communication connection are concurrently performed, the electronic device may control a communication circuit to operate according to a power control mode associated with each communication scheme. In a period in which the first communication connection and the second communication connection operate in the sleep mode in common, the electronic device may control the communication circuit to operate in a deep sleep mode.

Figure 8:
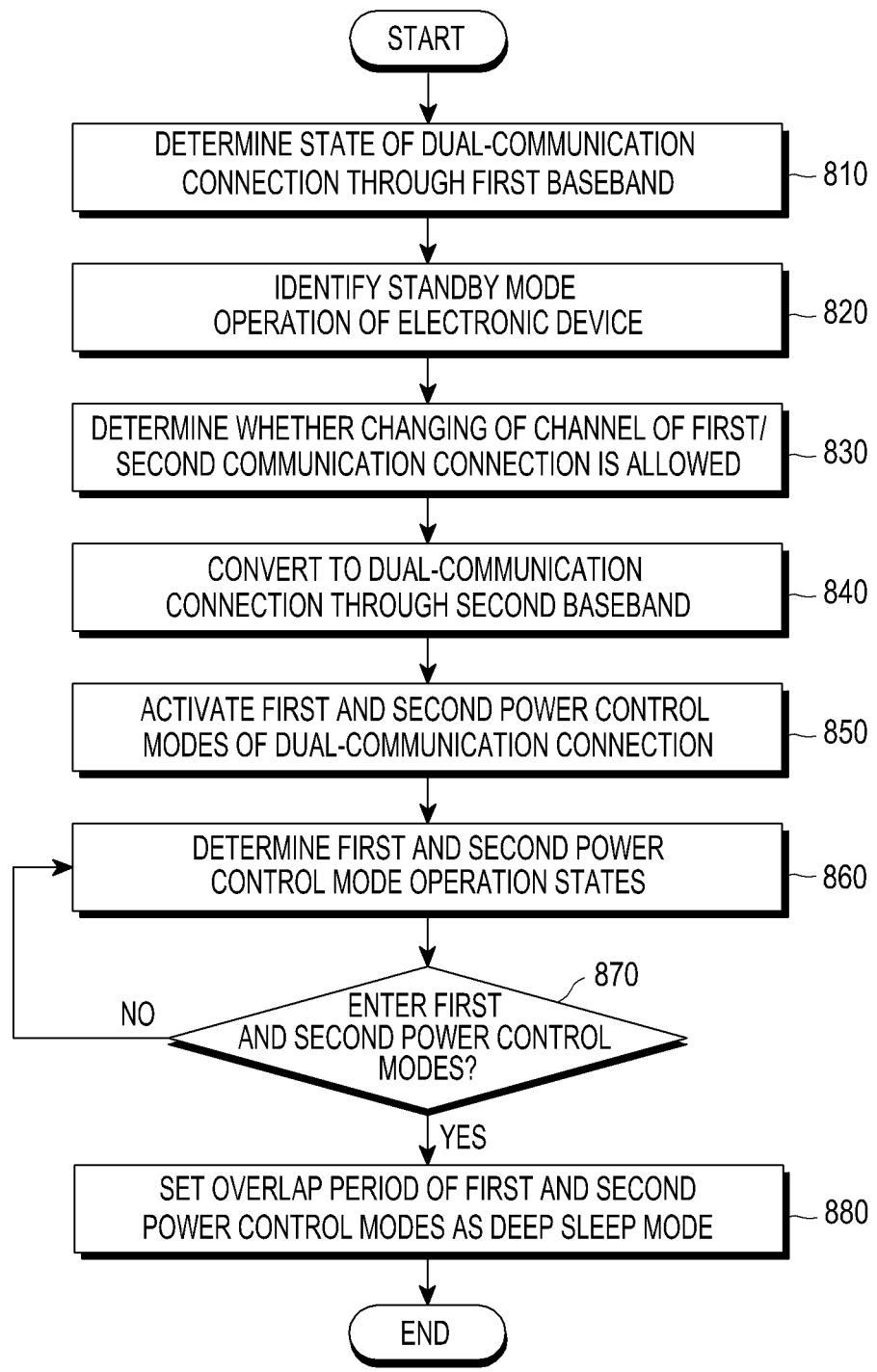
FIG. 8 is a flowchart illustrating an example of an operation of controlling power in an electronic device including a communication circuit that supports a plurality of communication connections according to various example embodiments of the present disclosure.

FIG. 8 is a flowchart illustrating an example of an operation of controlling power in an electronic device including a communication circuit that supports a plurality of communication connections according to various example embodiments of the present disclosure.

According to various embodiments of the present disclosure, a communication circuit of an electronic device may include a first circuit (e.g., a first baseband) to which a first frequency band is allocated and a second circuit (e.g., a second baseband) to which a second frequency band is allocated.

Referring to FIG. 8, according to various embodiments of the present disclosure, an electronic device determines a state of a dual-communication connection through the first baseband in operation 810. For example, a first communication connection and a second communication connection of the dual-communication connection may be performed through a first channel and a second channel, and the first channel and the second channel may be one of the channels of the frequency bands allocated to the first baseband.

According to various embodiments of the present disclosure, the electronic device determines that the electronic device operates in a standby mode (e.g., display off) in operation 820.

According to various embodiments of the present disclosure, in operation 830, the electronic device determines whether it is allowed to change at least one channel out of the channels of the first communication connection and the second communication connection to a channel of a frequency band that is different from the first frequency band.

According to various embodiments of the present disclosure, as the electronic device operates in the standby mode, the electronic device may perform control to enable respective communication connections of the dual-communication connection to be executed through multiple basebands so that a communication circuit operates with lower power than dual communication through a single baseband. For example, the electronic device may determine whether it is allowed to change a channel set for the second communication connection.

According to various embodiments of the present disclosure, when the first channel and the second channel are the same channel in the same band (e.g., the first baseband (2.4 GHz)), the electronic device may change a band of one of the communication connections to another band (e.g., the second baseband (5 GHz)), and may change one of the channels to another channel of another band or may change one of the channels to another channel in the same band.

According to various embodiments of the present disclosure, in operation 840, the electronic device converts the first communication connection and the second communication connection to a dual-communication connection that performs communication through respective channels of different frequency bands.

According to various embodiments of the present disclosure, in the electronic device, the communication connections may be concurrently performed through the first baseband and the second baseband depending on whether changing of channels (or frequency bands) of the first communication connection and the second communication connection is allowed. For example, when changing of the second channel of the second communication connection is allowed, the second channel may be set as one of the channels of a frequency band allocated to at least a part of the second baseband.

According to various embodiments of the present disclosure, in operation 850, the electronic device activates a first power control mode and a second power control mode associated with the first and second communication connections. For example, in the first and second power control modes, the communication circuit may be set to operate in an active mode and a sleep mode for each predetermined period or for each cycle.

According to various embodiments of the present disclosure, in operation 860, the electronic device determines a power control states of the first circuit and the second circuit according to the first power control mode and the second power control mode, in operation 860. The power control state may include whether each circuit operates according to a power control mode, whether each circuit enters an active period or a sleep period, or time information associated with each period (e.g., duration time or repetition cycle of a period).

According to various embodiments of the present disclosure, in operation 870, the electronic device determines whether the first communication connection and the second communication connection enter the first power control mode and the second power control mode, respectively. For example, the electronic device may determine whether a corresponding communication connection operates in an active period or a sleep period, based on an amount of current consumed in each circuit.

According to various embodiments of the present disclosure, when a result of operation 870 shows that at least some of the dual-communication connection does not operate according to a power control mode, the electronic device determines an operation state of the power control mode of the dual-communication connection again in operation 860.

According to various embodiments of the present disclosure, when a result of operation 870 shows that the first communication connection and the second communication connection of the dual-communication connection enter the first power control mode and the second power control mode, respectively, the electronic device may set a communication circuit to operate in a deep sleep mode in an overlap period in which the first communication connection and the second communication connection operate in a sleep mode in common, in operation 880. For example, the communication circuit may be configured to consume a smaller amount of power in the deep sleep mode, when compared to the case in which each circuit operates in the sleep mode according to the first power control mode and the second power control mode. As the communication circuit operates in the deep sleep mode, a data transmitting/receiving operation associated with the dual-communication connection is set to be interrupted during a predetermined period of time in the communication circuit.

According to various embodiments of the present disclosure, when it is allowed to change bands (or channels) of the first communication connection and the second communication connection, the electronic device may operate to perform the first communication through the first baseband, and to perform the second communication through the second baseband. For example, when the first communication or the second communication is performed using at least some channels of the first frequency band allocated to the first baseband, the electronic device may change a frequency band in which the second communication connection is performed to a second frequency band allocated to the second baseband so as to enable the second communication to be performed through at least some channels of the second frequency band.

Figure 9:
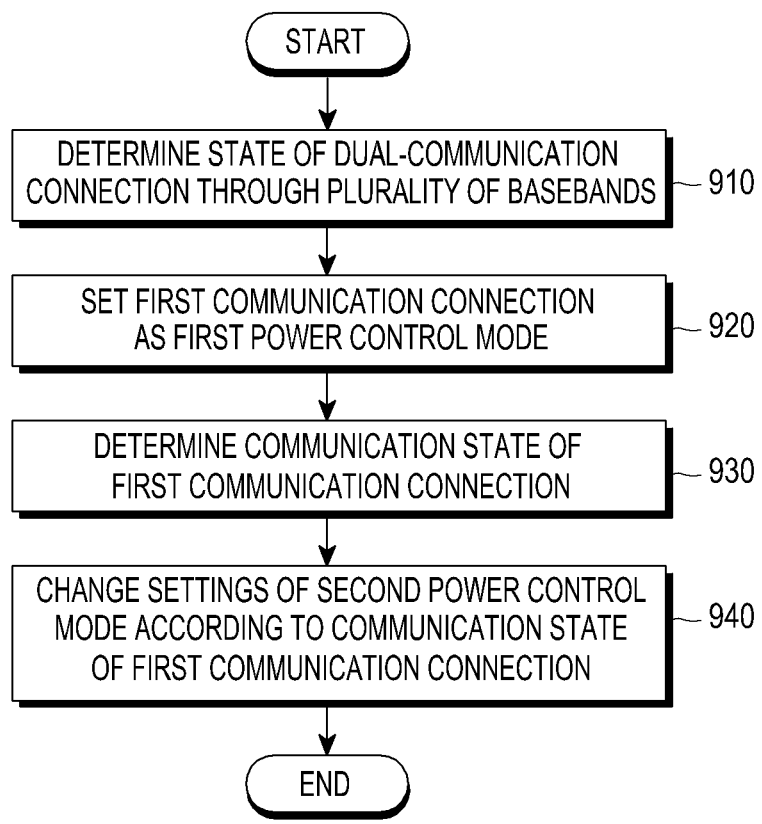
FIG. 9 is a flowchart illustrating an example of an operation of changing power control settings in an electronic device including a communication circuit that supports a plurality of communication connections according to various example embodiments of the present disclosure.

FIG. 9 is a flowchart illustrating an example of an operation of changing power control settings in an electronic device including a communication circuit that supports a plurality of communication connections according to various example embodiments of the present disclosure.

According to various embodiments of the present disclosure, the electronic device may include a communication circuit including a first circuit (e.g., a first baseband) to which a first frequency band (e.g., 2.4 GHz) is allocated and a second circuit (e.g., a second baseband) to which a second frequency band (e.g., 5 GHz) is allocated. A first communication connection may be performed through the first circuit and a second communication connection may be performed through the second circuit.

Referring to FIG. 9, according to various embodiments of the present disclosure, the electronic device determines a state of a dual-communication connection that concurrently performs different communication connections through the first circuit and the second circuit, respectively, in operation 910. For example, the dual-communication connection may include the first communication connection (e.g., Wi-Fi direct) and the second communication connection (Wi-Fi), and a state of each communication connection may be determined based on an amount of data transmitted or received, a data speed, noise, or the like. For example, the electronic device may establish the first communication connection (e.g., Wi-Fi) with an AP through the first circuit, and may establish the second communication connection (e.g., Wi-Fi direct) with a TV through the second circuit.

According to various embodiments of the present disclosure, in operation 920, the electronic device sets the first circuit to operate according to a first power control mode when the first communication connection is performed through the first circuit. For example, when the dual-communication connection is performed, the electronic device may perform control: to activate the first power control mode of the first communication connection to enable the first circuit to operate according to the first power control mode; and to activate the second power control mode of the second communication connection to enable the second circuit to operate according to the second power control mode.

According to various embodiments of the present disclosure, the electronic device determines a communication state (e.g., a communication speed) of the first communication connection in operation 930.

According to various embodiments of the present disclosure, the electronic device changes the settings of the second power control mode of the second communication connection based on the communication state of the first communication connection in operation 940.

According to various embodiments of the present disclosure, the electronic device may change the settings of the second power control mode based on at least a part of the state information of the first communication connection and the second communication connection operated according to the first power control mode and the second power control mode. For example, when the communication speed of the first communication connection is 100 Mbps and the communication speed of the second communication connection is 200 Mbps, the electronic device may set the communication speed of the second communication connection to the communication speed (100 Mbps) of the first communication connection.

According to various embodiments of the present disclosure, the electronic device may set the size of a sleep period in a second power control period, according to a ratio of a change in the communication speed of the second communication connection. For example, the electronic device may set the size of the sleep period (e.g., 100 ms) to 50 ms according to the ratio (e.g., 50%) of a changed communication speed (e.g., 100 Mbps) of the second communication connection to a previous value (e.g., 200 Mbps).

According to various embodiments of the present disclosure, to reduce an amount of data that has been transmitted/received but lost or damaged due to a difference in communication states between the first communication connection and the second communication connection, the electronic device may set the settings of the second power control mode to a value corresponding to the communication state of the first communication connection.

Figure 10:
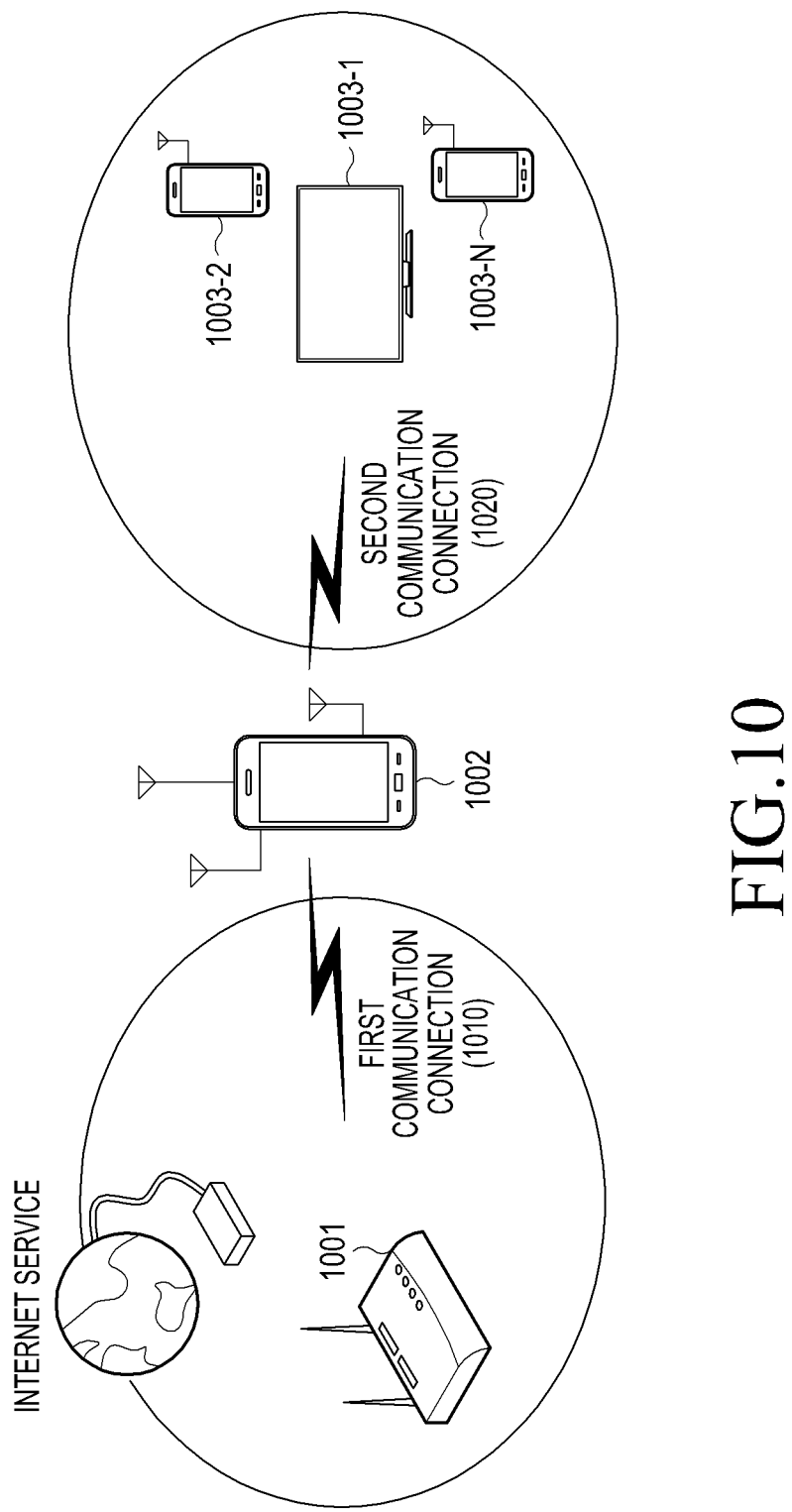
FIG. 10 is a diagram illustrating an example of a network environment of an electronic device including a communication circuit that supports a plurality of communication connections according to various example embodiments of the present disclosure.

FIG. 10 is a diagram illustrating an example of a network environment of an electronic device including a communication circuit that supports a plurality of communication connections according to various example embodiments of the present disclosure.

Referring to FIG. 10, a network environment may include an AP 1001, an electronic device 1002, and/or at least one NAN device (e.g., NAN device 1003-1 to 1003-N).

According to various embodiments of the present disclosure, the electronic device 1002 may perform a dual-communication connection. For example, the dual-communication connection may include: a first communication connection 1010 in which the AP 1001 and the electronic device 1002 communicate at a first speed; and a second communication connection 1020 in which the electronic device 1002 and at least one NAN device communicate at a second speed, which is lower than the first speed.

According to various embodiments of the present disclosure, the electronic device 1002 may include: a first circuit (e.g., a first baseband) that performs the first communication connection 1010 with the AP 1001; and a second circuit (e.g., a second baseband) that performs the second communication connection 1020 with the at least one NAN device. For example, when the first communication connection and the second communication connection are concurrently performed, the electronic device 1002 may control the first circuit to operate according to a first power control mode of the first communication connection 1010, and may control the second circuit to operate according to a second power control mode of the second communication connection 1020.

According to various embodiments of the present disclosure, the electronic device 1002 may determine states of the first communication connection and the second communication connection, and may change the settings of a power control mode of the dual-communication connection. For example, the settings of the power control mode may include a communication speed, an amount of traffic, a communication channel, or an NoA ratio. In addition, the settings may include various settings that may affect power consumption of a communication circuit.

According to various embodiments of the present disclosure, when the electronic device operates according to the first power control mode and the second power control mode, the electronic device may identify an active period in which the first circuit and the second circuit operate in an active mode in common. For example, as the second speed of the second communication connection 1020 is measured to be lower than the first speed of the first communication connection 1010 in the active period, the electronic device may set the communication speed in the settings of the first power control mode to a value corresponding to the second speed.

According to various embodiments of the present disclosure, as the electronic device changes power control settings of a plurality of communication connections, an amount of data that is lost or damaged due to different communication states may be reduced.

Figure 11:
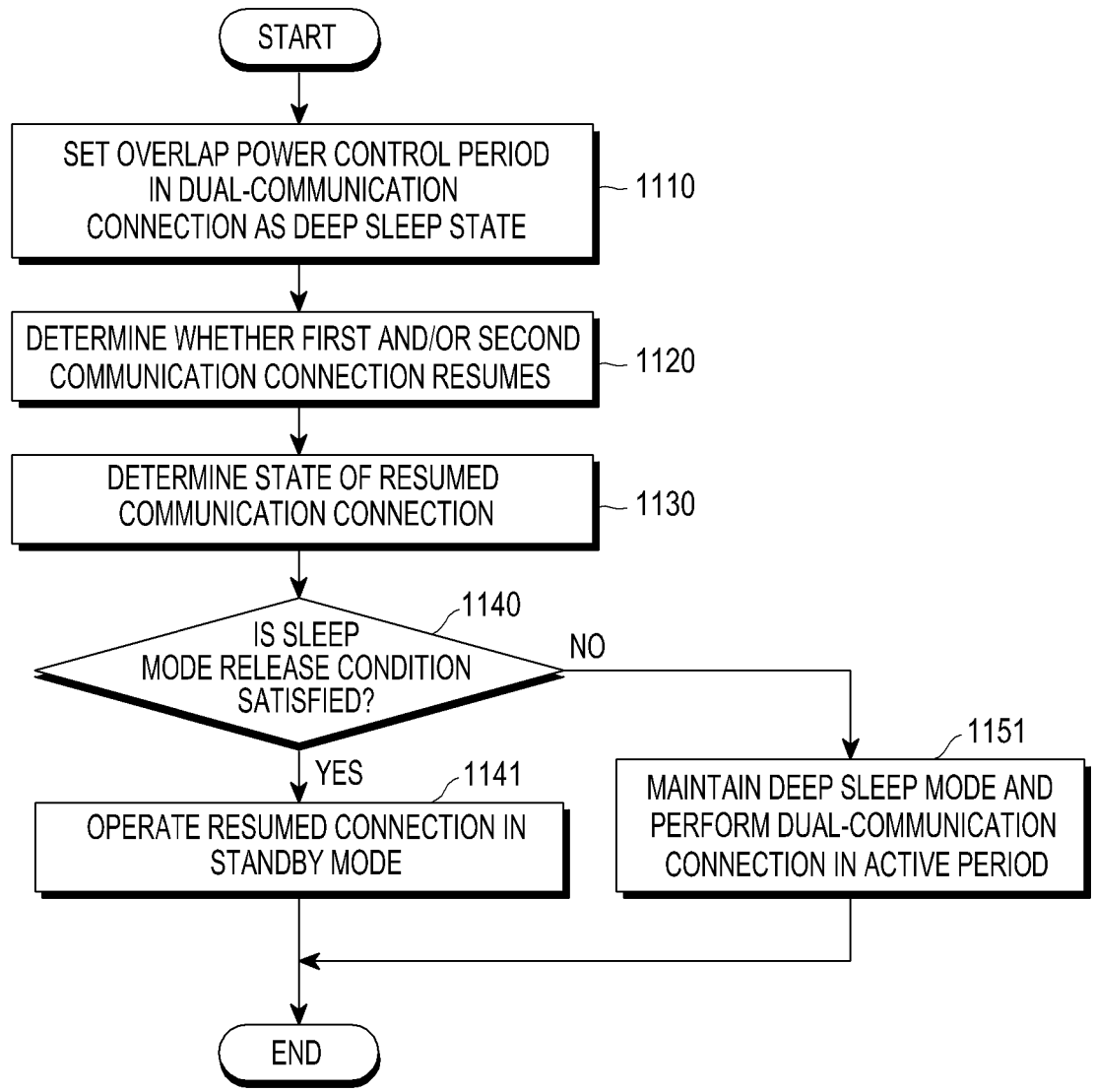
FIG. 11 is a flowchart illustrating an example of an operation of changing power control settings in an electronic device including a communication circuit that supports a plurality of communication connections according to various example embodiments of the present disclosure.

FIG. 11 is a flowchart illustrating an example of an operation of changing power control settings in an electronic device including a communication circuit that supports a plurality of communication connections according to various example embodiments of the present disclosure.

According to various embodiments of the present disclosure, the electronic device may include a first circuit that performs a first communication connection and a second circuit that performs a second communication connection, and may perform a dual-communication connection that concurrently performs the first communication connection and the second communication connection.

Referring to FIG. 11, according to various embodiments of the present disclosure, the electronic device may be set as a deep sleep mode in a period in which the first circuit and the second circuit of the dual-communication connection operate in a sleep mode in common, in operation 1110. For example, the deep sleep mode is a state in which a communication circuit consumes an amount of power that is less than or equal to a predetermined value during a predetermined period of time, a receiving operation is interrupted, and the communication circuit may be set to interrupt operations of elements, excluding minimum elements.

According to various embodiments of the present disclosure, as the first circuit and the second circuit are set to perform the first communication connection and the second communication connection according to the first power control mode and the second power control mode, each circuit may operate in an active mode and a sleep mode in a set repeated period. For example, the electronic device may set the first circuit and the second circuit to operate in a deep sleep mode in a sleep period in which the first circuit and the second circuit operate in the sleep mode in common.

According to various embodiments of the present disclosure, a deep sleep mode is an operation mode set to operate with a smaller amount of power than a sleep mode. In the deep sleep mode, operations of elements, excluding some of the elements forming the communication circuit, may be interrupted.

The electronic device determines whether the first communication connection and/or the second communication connection resumes in operation 1120 according to various embodiments. For example, when the first circuit and the second circuit operate in the sleep mode in common and the communication circuit operates in the deep sleep mode, the electronic device identifies a type or an amount of data received by the electronic device, and may determine whether to release an operation of the deep sleep mode and resume a communication connection.

The electronic device determines a state of the resumed communication connection in operation 1130 according to various embodiments. For example, after the communication resumes, the electronic device may determine a state of a corresponding communication connection based on at least some of an amount of data, a type of data, and a transmission/reception speed of data transmitted/received through each of the first communication connection and the second communication connection.

The electronic device determines whether the communication circuit satisfies a deep sleep mode release condition based on at least some of each communication connection state in operation 1140 according to various embodiments. For example, the deep sleep mode release condition may include a case in which a message corresponding to a predetermined importance or a predetermined type (e.g., a multicast or broadcast message) is received, or a case in which a transmitted/received message has a speed greater than or equal to a predetermined speed or has an amount of data greater than a predetermined amount of data. In addition, various conditions for releasing the deep sleep mode may be possible according to settings of a user or a manufacturer.

When a result of determination in operation 1140 shows that the state of the first communication connection from among the communication connections satisfies the sleep mode release condition, the electronic device may enable the resumed connection to operate in a standby mode in operation 1141 according to various embodiments. For example, the electronic device deactivates the first power control mode set in the first circuit and deactivates the deep sleep mode set in the communication circuit, thereby enabling the electronic device to operate in the standby mode. For example, the standby mode is an operation mode for waiting for a data transmission/reception, a reception and transmission operation of the electronic device may be activated.

When a result of the determination in operation 1140 shows that the communication circuit does not satisfy the sleep mode release condition, the electronic device may set the first circuit and the second circuit to maintain the operations as the deep sleep mode, and may set the first circuit and the second circuit to perform a data transmission/reception operation in an active period in which the first communication connection and the second communication connection operate in the active mode in common in operation 1151 according to various embodiments.

According to various embodiments of the present disclosure, the electronic device performs control to drive the communication circuit with low power by maintaining an operation of the deep sleep mode according to a state of a communication connection, and sets the communication circuit to perform communication only in an active period, thereby reducing power consumption of the communication circuit.

Figure 12:
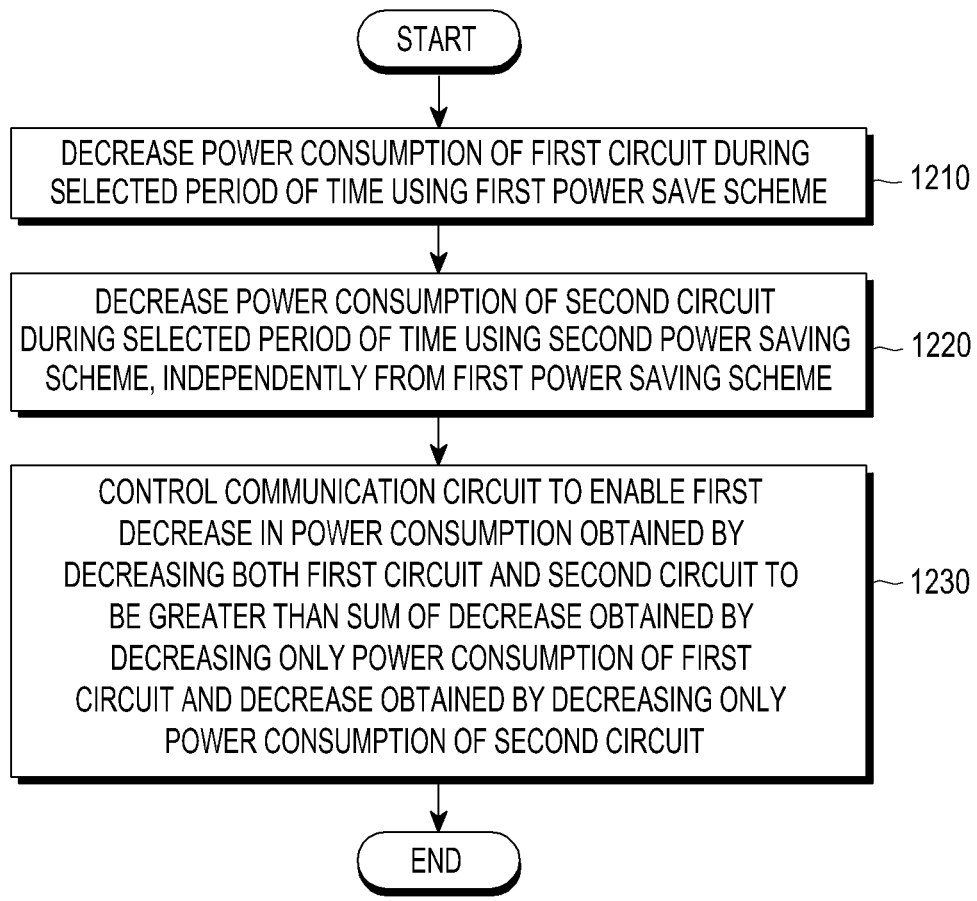
FIG. 12 is a flowchart illustrating an example of an operation of controlling power in an electronic device including a communication circuit that supports a plurality of communication connections according to various example embodiments of the present disclosure.

FIG. 12 is a flowchart illustrating an example of an operation of controlling power in an electronic device including a communication circuit that supports a plurality of communication connections according to various example embodiments of the present disclosure.

According to various embodiments of the present disclosure, a communication circuit may include a first circuit (e.g., a first baseband) to which a first frequency band is allocated and a second circuit (e.g., a second baseband) to which a second frequency band is allocated.

Referring to FIG. 12, an electronic device reduces power consumption of the first circuit during a selected period of time, using a first power save scheme, in operation 1210.

In operation 1220, the electronic device reduces power consumption of the second circuit during a selected period of time, using a second power saving scheme, independently from the first power saving scheme.

In operation 1230, the electronic device may control the communication circuit to enable a first decrease in power consumption of the communication circuit obtained by decreasing power consumption of the first circuit and the second circuit to be greater than the sum of a second decrease in power consumption of the communication circuit obtained by decreasing only power consumption of the first circuit and a decrease in power consumption obtained by decreasing only power consumption of the second circuit.

According to various embodiments of the present disclosure, the electronic device may perform operation 1230 according to settings of the first power saving scheme and the second power saving scheme, and when the communication circuit is controlled according to logic of the first circuit and the second circuit, operation 1230 may be omitted.

Figure 13:
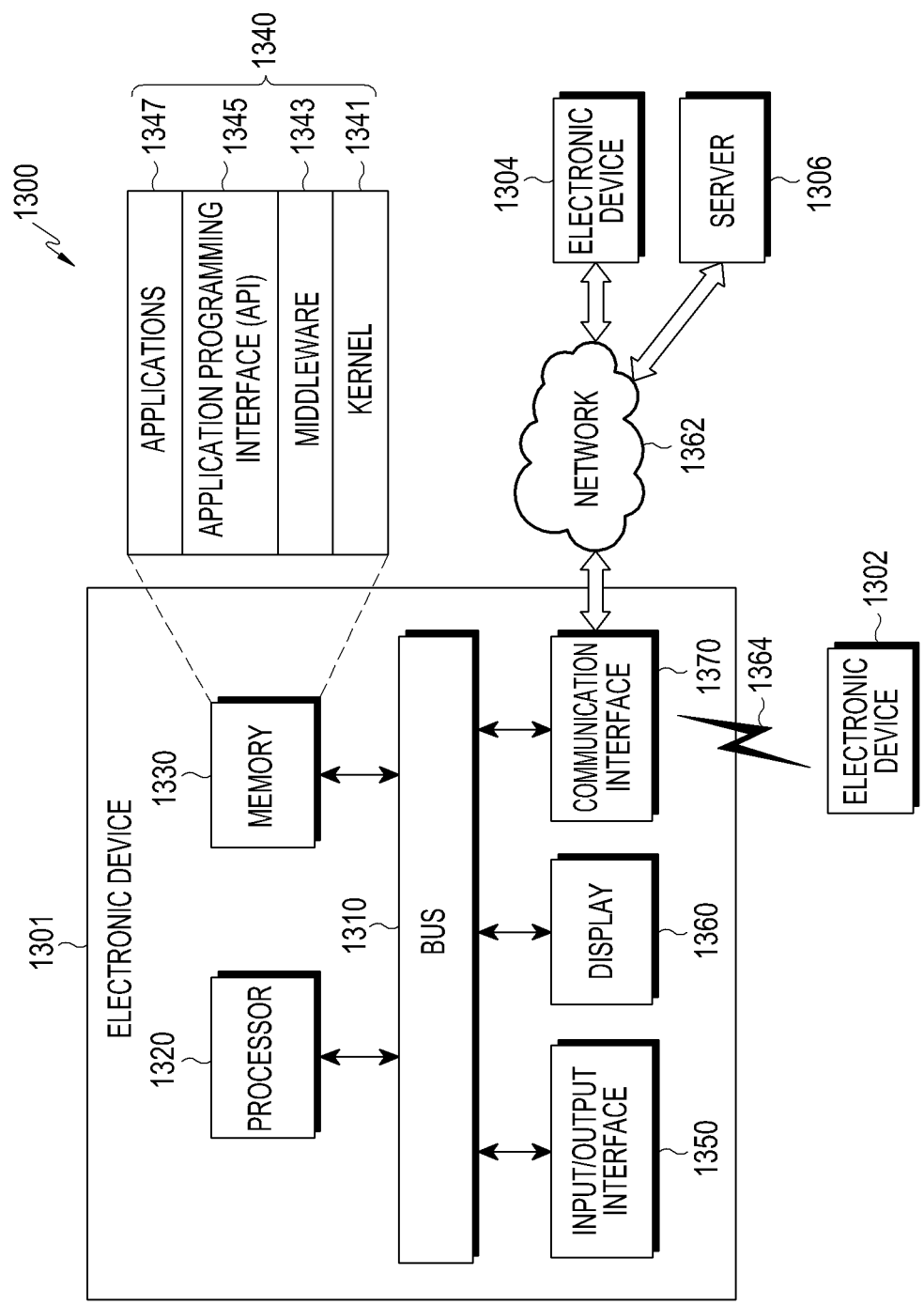
FIG. 13 is a block diagram illustrating an example of an electronic device in a network environment, according to various example embodiments of the present disclosure.

FIG. 13 is a block diagram illustrating an example of an electronic device in a network environment, according to various example embodiments of the present disclosure.

FIG. 13 illustrates an electronic device 1301 in a network environment 1300, and the electronic device 1301 may include a bus 1310, a processor (e.g., including processing circuitry) 1320, a memory 1330, an input/output interface (e.g., including interface circuitry) 1350, a display 1360, and a communication interface (e.g., including communication circuitry) 1370.

According to various embodiments of the present disclosure, at least one of the elements of the electronic device 1301 may be omitted, or other elements may be additionally included in the electronic device 1301. The bus 1310 may include a circuit that interconnects the elements 1310 to 1370 and transfers communication (e.g., control messages or data) between the elements.

The processor 1320 may include various processing circuitry, such as, for example, and without limitation, one or more of a dedicated processor, a central processing unit, an application processor, and a communication processor (CP). The processor 1320, for example, may carry out operations or data processing relating to the control and/or communication of at least one other element of the electronic device 1301.

The memory 1330 may include a volatile and/or non-volatile memory. The memory 1330 may store, for example, instructions or data relevant to at least one other element of the electronic device 1301. According to an embodiment, the memory 1330 may store software and/or a program 1340. The program 1340 may include, for example, a kernel 1341, middleware 1343, an application programming interface (API) 1345, and/or application programs (or "applications") 1347. At least some of the kernel 1341, the middleware 1343, and the API 1345 may be referred to as an Operating System (OS). For example, the kernel 1341 may control or manage the system resources (e.g., the bus 1310, the processor 1320, the memory 1330, and the like) that are used to execute operations or functions implemented in the other programs (e.g., the middleware 1343, the API 1345, or the application programs 1347). Furthermore, the kernel 1341 may provide an interface through which the middleware 1343, the API 1345, or the application programs 1347 may access the individual elements of the electronic device 1301 to control or manage the system resources.

The middleware 1343 may function as, for example, an intermediary for allowing the API 1345 or the application programs 1347 to communicate with the kernel 1341 to exchange data. Furthermore, the middleware 1343 may process one or more task requests, which are received from the application programs 1347, according to priorities thereof. For example, the middleware 1343 may assign priorities for using the system resources (e.g., the bus 1310, the processor 1320, the memory 1330, or the like) of the electronic device 1301 to one or more of the application programs 1347, and may process the one or more task requests. The API 1345 is an interface used for the applications 1347 to control a function provided from the kernel 1341 or the middleware 1343, and may include, for example, at least one interface or function (e.g., instruction) for file control, window control, image processing, text control, or the like.

For example, the input/output interface 1350 may include various interface circuitry and forward instructions or data, which is input from a user or an external device, to the other element(s) of the electronic device 1301, or may output instructions or data, which is received from the other element(s) of the electronic device 1301, to the user or the external device.

The display 1360 may include, for example, a liquid crystal display (LCD), a light emitting diode (LED) display, an organic light emitting diode (OLED) display, a micro electro mechanical system (MEMS) display, or an electronic paper display, or the like, but is not limited thereto. The display 1360 may display, for example, various types of content (e.g., text, images, videos, icons, and/or symbols) for a user. The display 1360 may include a touch screen and may receive, for example, a touch, gesture, proximity, or hovering input using an electronic pen or the user's body part.

The communication interface 1370 may configure communication, for example, between the electronic device 1301 and an external device (e.g., a first external electronic device 1302, a second external electronic device 1304, or a server 1306). For example, the communication interface 1370 may include various communication circuitry and be connected to a network 1362 through wireless or wired communication to communicate with an external device (e.g., the second external electronic device 1304 or the server 1306). Moreover, the communication interface 1370 may use short-range communication 1364 to connect to various devices.

The wireless communication may include a cellular communication that uses, for example, at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth, Bluetooth low energy (BLE), ZigBee, near field communication (NFC), magnetic secure transmission, Radio Frequency (RF), and body area network (BAN). According to an embodiment, the wireless communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), power line communication, and a plain old telephone service (POTS). The network 1362 may include a telecommunications network, for example, at least one of a computer network (e.g., a LAN or a WAN), the Internet, and a telephone network.

Each of the first and second external electronic devices 1302 and 1304 may be of type same as or different from the electronic device 1301. According to various embodiments, all or some of the operations performed by the electronic device 1301 may be performed by another electronic device or a plurality of electronic devices (e.g., the electronic device 1302 or 1304 or the server 1306). According to an embodiment, when the electronic device 1301 has to perform some functions or services automatically or by request, the electronic device 1301 may request another device (e.g., the electronic device 1302 or 1304 or the server 1306) to perform at least some functions relating thereto, instead of, or in addition to, performing the functions or services by itself. Another electronic device (e.g., the electronic device 1302 or 1304, or the server 1306) may execute the requested functions or the additional functions, and may deliver a result of the execution to the electronic device 1301. The electronic device 1301 may provide the received result as it is, or may additionally process the received result to provide the requested functions or services. To this end, for example, cloud computing, distributed computing, or client-server computing technology may be used.

Figure 14:
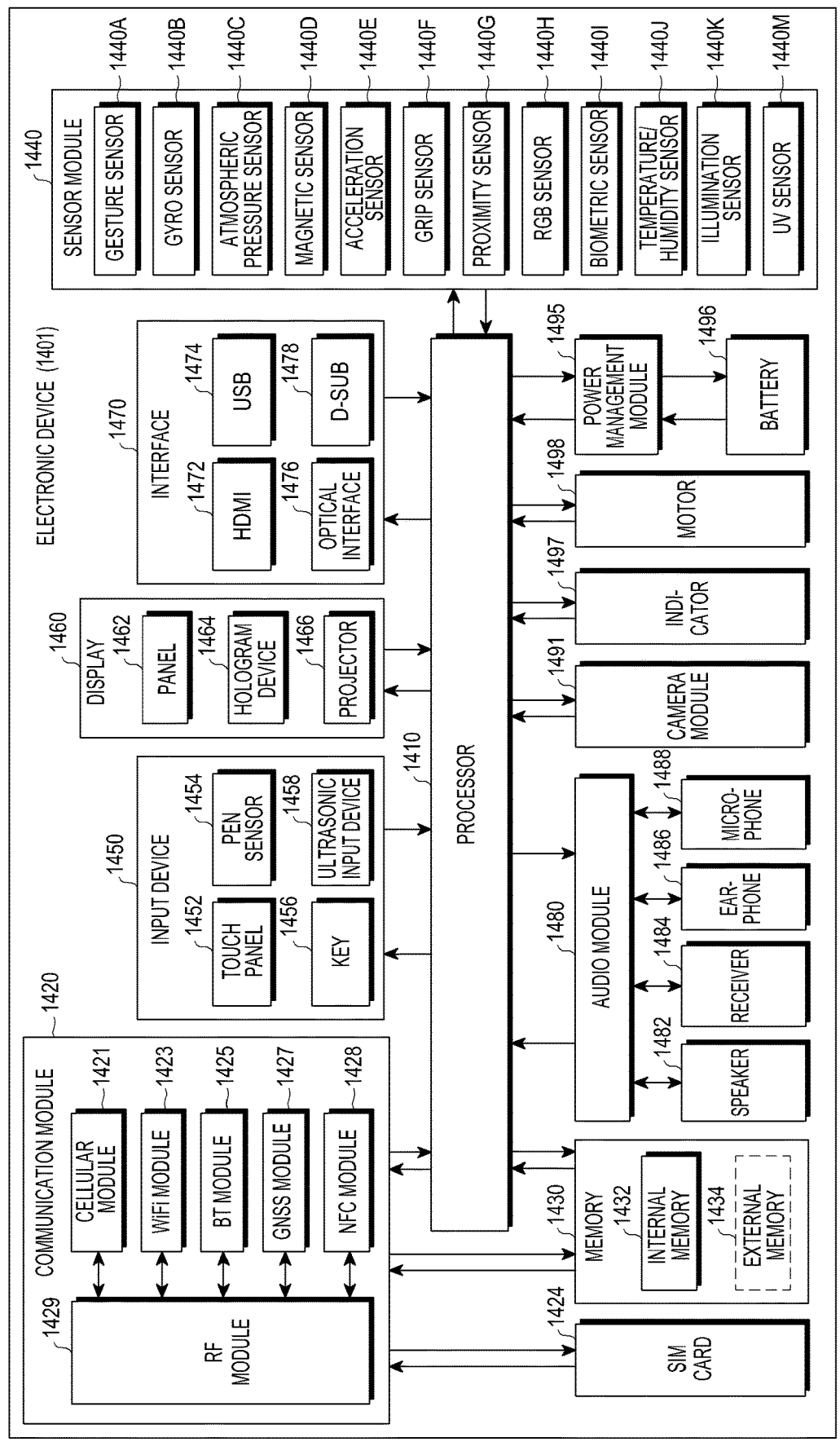
FIG. 14 is a block diagram illustrating an example configuration of an electronic device according to various example embodiments of the present disclosure.

FIG. 14 is a block diagram illustrating an example configuration of an electronic device according to various example embodiments of the present disclosure.

According to various embodiments of the present disclosure, an electronic device 1401 may include a part or the entirety of the electronic device 1301 of FIG. 13.

Referring to FIG. 14, the electronic device 1401 may include at least one processor (e.g., AP) (e.g., including processing circuitry) 1410, a communication module (e.g., including communication circuitry) 1420, a subscriber identification module 1424, a memory 1430, a sensor module 1440, an input device (e.g., including input circuitry) 1450, a display 1460, an interface (e.g., including interface circuitry) 1470, an audio module 1480, a camera module 1491, a power management module 1495, a battery 1496, an indicator 1497, and a motor 1498.

The processor 1410 may include various processing circuitry and control a plurality of hardware or software elements connected thereto and may perform various data processing and operations by driving an operating system or an application program. The processor 1410 may be embodied, for example, as a system on chip (SoC). According to an embodiment, the processor 1410 may further include a graphic processing unit (GPU) and/or an image signal processor. The processor 1410 may also include at least some (e.g., a cellular module 1421) of the elements illustrated in FIG. 14. The processor 1410 may load, in a volatile memory, instructions or data received from at least one of the other elements (e.g., a non-volatile memory), process the loaded instructions or data, and store the result data in the non-volatile memory.

The communication module 1420 may have a configuration that is the same as, or similar to, that of the communication interface 1370. The communication module 1420 may include various communication circuitry, such as, for example, and without limitation, a cellular module 1421, a WiFi module 1423, a Bluetooth module 1425, a GNSS module 1427, an NFC module 1428, and an RF module 1429. The cellular module 1421 may provide, for example, a voice call, a video call, a text message service, an Internet service, or the like through a communication network. According to an embodiment, the cellular module 1421 may identify and authenticate the electronic device 1401 within a communication network using the subscriber identification module 1424 (e.g., a SIM card). According to an embodiment, the cellular module 1421 may perform at least some of the functions that the processor 1410 may provide. According to an embodiment, the cellular module 1421 may include a communication processor (CP). According to some embodiments, at least some (e.g., two or more) of the cellular module 1421, the Wi-Fi module 1423, the BT module 1425, the GNSS module 1427, and the NFC module 1428 may be included in one Integrated Chip (IC) or IC package. The RF module 1429, for example, may transmit/receive a communication signal (e.g., an RF signal). The RF module 1429 may include, for example, a transceiver, a power amp module (PAM), a frequency filter, a low noise amplifier (LNA), an antenna, or the like. According to another embodiment, at least one of the cellular module 1421, the Wi-Fi module 1423, the BT module 1425, the GNSS module 1427, and the NFC module 1428 may transmit/receive an RF signal through a separate RF module. The subscriber identification module 1424 may include, for example, a card that includes a subscriber identification module, or an embedded SIM, and may contain unique identification information (e.g., an integrated circuit card identifier (ICCID)) or subscriber information (e.g., international mobile subscriber identity (IMSI)).

The memory 1430 (e.g., the memory 1330) may include, for example, an embedded memory 1432 and/or an external memory 1434. The embedded memory 1432 may include, for example, at least one of a volatile memory (e.g., a DRAM, an SRAM, an SDRAM, and the like) and a non-volatile memory (e.g., a one time programmable ROM (OTPROM), a PROM, an EPROM, an EEPROM, a mask ROM, a flash ROM, a flash memory, a hard disc drive, or a solid state drive (SSD)). The external memory 1434 may include a flash drive, for example, a compact flash (CF), a secure digital (SD), a Micro-SD, a Mini-SD, an eXtreme digital (xD), a multi-media card (MMC), a memory stick, or the like. The external memory 1434 may be functionally and/or physically connected to the electronic device 1401 through various interfaces.

The sensor module 1440 may, for example, measure a physical quantity or detect the operation state of the electronic device 1401, and may convert the measured or detected information into an electrical signal. The sensor module 1440 may include, for example, at least one of a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., a red, green, blue (RGB) sensor), a biometric sensor 1440I, a temperature/humidity sensor 1440J, a light (e.g., illumination) sensor 1440K, and a ultraviolet (UV) sensor 1440M. Additionally or alternatively, the sensor module 1440 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling one or more sensors included therein. According to an embodiment, the electronic device 1401 may further include a processor, which is configured to control the sensor module 1440, as a part of the processor 1410 or separately from the processor 1410, in order to control the sensor module 1440 while the processor 1410 is in a sleep state.

The input device 1450 may include various input circuitry, such as, for example, and without limitation, a touch panel 1452, a (digital) pen sensor 1454, a key 1456, or an ultrasonic input device 1458. The touch panel 1452 may use, for example, at least one of a capacitive type, a resistive type, an infrared type, and an ultrasonic type. Furthermore, the touch panel 1452 may further include a control circuit. The touch panel 1452 may further include a tactile layer to provide a tactile reaction to a user. The (digital) pen sensor 1454 may include, for example, a recognition sheet that is a part of, or separate from, the touch panel. The key 1456 may include, for example, a physical button, an optical key, or a keypad. The ultrasonic input device 1458 may detect ultrasonic waves, which are generated by an input tool, through a microphone (e.g., a microphone 1488) and may identify data corresponding to the detected ultrasonic waves.

The display 1460 (e.g., the display 1360) may include a panel 1462, a hologram device 1464, a projector 1466, and/or a control circuit for controlling them. The panel 1462 may be embodied to be, for example, flexible, transparent, or wearable. The panel 1462, together with the touch panel 1452, may be configured as one or more modules. According to an embodiment, the panel 1462 may include a pressure sensor (or a force sensor), which may measure a strength of pressure of a user's touch. The pressure sensor may be embodied to be integrated with the touch panel 1452 or embodied by one or more sensors separated from the touch panel 1452. The hologram device 1464 may show a three dimensional image in the air by using an interference of light. The projector 1466 may display an image by projecting light onto a screen. The screen may be located, for example, inside or outside the electronic device 1401.

The interface 1470 may include various interface circuitry, such as, for example, and without limitation, an HDMI 1472, a USB 1474, an optical interface 1476, or a D-subminiature (D-sub) 1478. The interface 1470 may be included, for example, in the communication interface 1370 illustrated in FIG. 13. Additionally or alternatively, the interface 1470 may include, for example, a mobile high-definition link (MHL) interface, an SD card/multi-media card (MMC) interface, or an infrared data association (IrDA) standard interface.

The audio module 1480, for example, may convert a sound into an electrical signal, and vice versa. At least some elements of the audio module 1480 may be included, for example, in the input/output interface 1350 illustrated in FIG. 13. The audio module 1480 may process sound information that is input or output through, for example, a speaker 1482, a receiver 1484, earphones 1486, the microphone 1488, or the like. The camera module 1491 is a device that can photograph a still image and a moving image. According to an embodiment, the camera module 1491 may include one or more image sensors (e.g., a front sensor or a rear sensor), a lens, an image signal processor (ISP), or a flash (e.g., an LED or xenon lamp). The power management module 1495 may manage, for example, the power of the electronic device 1401. According to an embodiment, the power management module 1495 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, or the like. Additional circuits (e.g., a coil loop, a resonance circuit, a rectifier, or the like) for wireless charging may be further included. The battery gauge may measure, for example, the residual quantity of the battery 1496 and a voltage, current, or temperature during charging. The battery 1496 may include, for example, a rechargeable battery and/or a solar battery.

The indicator 1497 may indicate a particular state (e.g., a booting state, a message state, a charging state, or the like) of the electronic device 1401 or a part (e.g., the processor 1410) thereof. The motor 1498 may convert an electrical signal into a mechanical vibration and may generate a vibration, a haptic effect, or the like. The electronic device 1401 may include a mobile TV support device (e.g., a GPU) that can process media data according to a standard, such as digital multimedia broadcasting (DMB), digital video broadcasting (DVB), mediaFlo™, or the like.

Each of the above-described component elements of hardware according to the present disclosure may be configured with one or more components, and the names of the corresponding component elements may vary based on the type of electronic device. In various embodiments, an electronic device (for example, the electronic device 1401) may omit some elements or may further include additional elements, or some of the elements of the electronic device may be combined with each other to configure one entity, in which case the electronic device may identically perform the functions of the corresponding elements prior to the combination.

Figure 15:
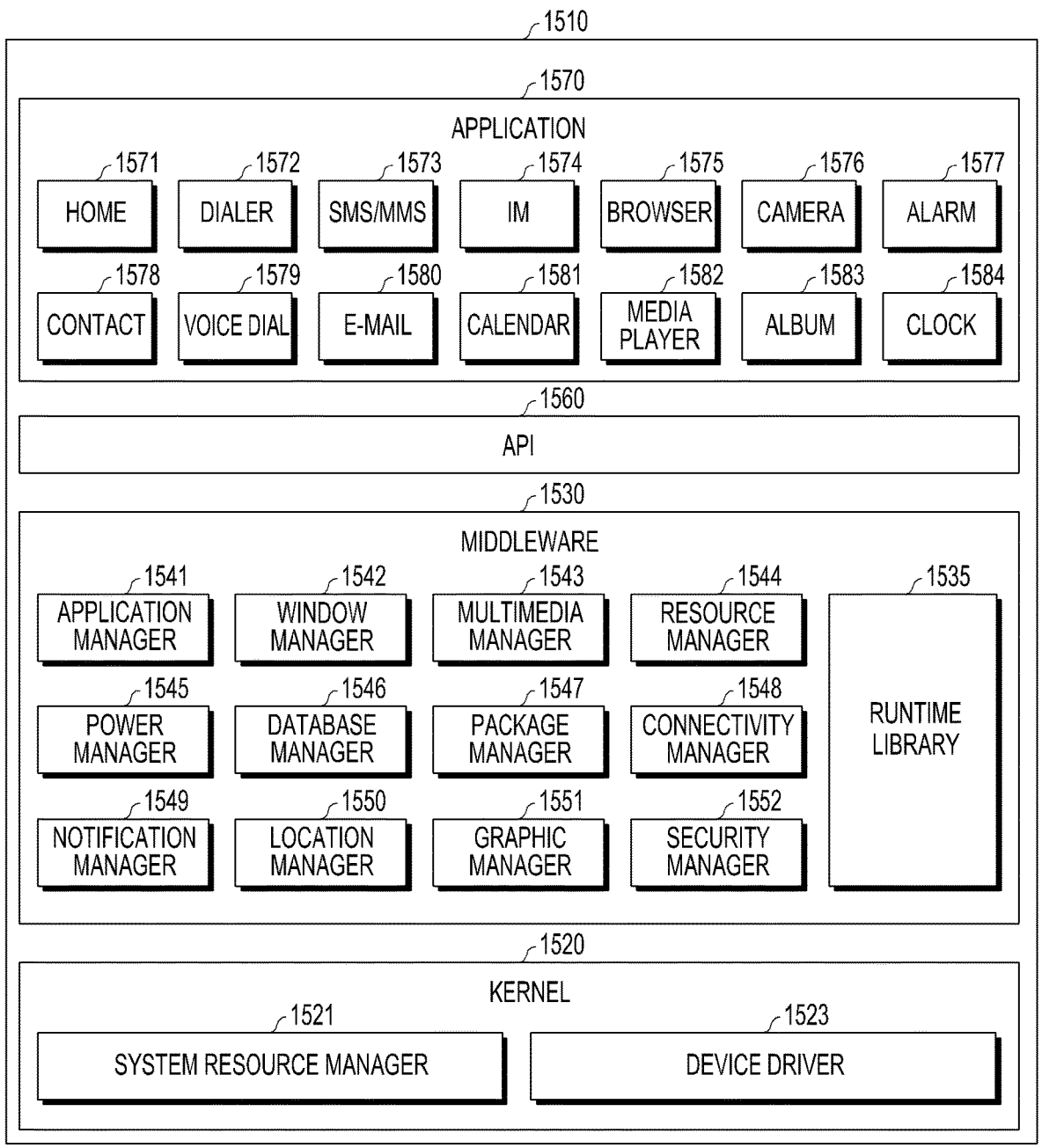
FIG. 15 is a block diagram illustrating an example configuration of a program module according to various example embodiments of the present disclosure.

FIG. 15 is a block diagram illustrating an example configuration of a program module according to various example embodiments of the present disclosure.

According to various embodiments of the present disclosure, a program module 1510 (e.g., a program 1340) may include an operating system that controls resources related to an electronic device (e.g., the electronic device 1301) and/or various applications (e.g., the application program 1347) operating in the operating system. The operating system may include, for example, Android™, iOS™, Windows™, Symbian™, Tizen™, or Bada™.

Referring to FIG. 15, the program module 1510 may include a kernel 1520 (e.g., the kernel 1341), a middleware 1530 (e.g., the middleware 1343), an API 1560 (e.g., the API 1345), and/or an application 1570 (e.g., the application program 1347). At least a part of the program module 1510 may be preloaded on the electronic device, or may be downloaded from an external electronic device (e.g., the electronic device 1302 or 1304 or the server 1306).

The kernel 1520 may include, for example, a system resource manager 1521 and/or a device driver 1523. The system resource manager 1521 may control, allocate, or retrieve system resources. According to an embodiment, the system resource manager 1521 may include a process manager, a memory manager, or a file system manager. The device driver 1523 may include, for example, a display driver, a camera driver, a Bluetooth driver, a shared memory driver, a USB driver, a keypad driver, a Wi-Fi driver, an audio driver, or an inter-process communication (IPC) driver. For example, the middleware 1530 may provide a function required by the applications 1570 in common, or may provide various functions to the applications 1570 through the API 1560 to enable the applications 1570 to use the limited system resources within the electronic device.

According to an embodiment, the middleware 1530 may include at least one of a runtime library 1535, an application manager 1541, a window manager 1542, a multi-media manager 1543, a resource manager 1544, a power manager 1545, a database manager 1546, a package manager 1547, a connectivity manager 1548, a notification manager 1549, a location manager 1550, a graphic manager 1551, and a security manager 1552.

The runtime library 1535 may include, for example, a library module that a compiler uses in order to add a new function through a programming language while the applications 1570 are being executed. The runtime library 1535 may perform input/output management, memory management, or arithmetic function processing. The application manager 1541 may manage, for example, the life cycles of the applications 1570. The window manager 1542 may manage GUI resources used for a screen. The multimedia manager 1543 may identify formats required for reproducing various media files and may encode or decode a media file using a codec suitable for a corresponding format. The resource manager 1544 may manage the source codes of the applications 1570 or the space of a memory. The power manager 1545 may manage, for example, the capacity or power of a battery, and may provide power information required for operating the electronic device. According to an embodiment, the power manager 1545 may interoperate with a basic input/output system (BIOS). The database manager 1546 may, for example, generate, search, or change databases to be used by the applications 1570. The package manager 1547 may manage the installation or updating of an application that is distributed in the form of a package file.

The connectivity manager 1548 may manage, for example, a wireless connection. The notification manager 1549 may provide an event (e.g., an arrival message, an appointment, a proximity notification, and the like) to a user. The location manager 1550 may manage, for example, the location information of an electronic device. The graphic manager 1551 may manage a graphic effect to be provided to a user, or a user interface relating to the graphic effect. The security manager 1552 may provide, for example, system security or user authentication. According to an embodiment, the middleware 1530 may include a telephony manager for managing a voice or video call function of an electronic device or a middleware module capable of forming a combination of the functions of the above-described elements. According to an embodiment, the middleware 1530 may provide a module specialized for each type of operation system. The middleware 1530 may dynamically remove some of the existing elements, or may add new elements.

The API 1560 is, for example, a set of API programming functions, and may be provided as different configurations according to operating systems. For example, in the case of Android or iOS, one API set may be provided for each platform, and in the case of Tizen, two or more API sets may be provided for each platform.

The applications 1570 may include applications that provide, for example, home 1571, dialer 1572, SMS/MMS 1573, instant message (IM) 1574, browser 1575, camera 1576, alarm 1577, contacts 1578, voice dial 1579, e-mail 1580, calendar 1581, media player 1582, album 1583, clock 1584, health care (e.g., measuring exercise quantity or blood glucose), an environment information (e.g., atmospheric pressure, humidity, or temperature information), or the like. According to an embodiment, the applications 1570 may include an information exchange application that can support the exchange of information between an electronic device and an external electronic device. The information exchange application may include, for example, a notification relay application for relaying particular information to an external electronic device or a device management application for managing an external electronic device. For example, the notification relay application may relay notification information generated in other applications of the electronic device to an external electronic device, or may receive notification information from an external electronic device to provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device. According to an embodiment, the applications 1570 may include applications (e.g., a health care application of a mobile medical appliance) that are designated according to the property of an external electronic device. According to an embodiment, the applications 1570 may include applications received from an external electronic device. At least some of the program module 1510 may be implemented (e.g., executed) by software, firmware, hardware (e.g., the processor 1410), or a combination of two or more thereof, and may include a module, a program, a routine, an instruction set, or a process for performing one or more functions.

The term "module" as used herein may include a unit comprising hardware, software, or firmware or any combination thereof, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, and without limitation, a dedicated processor, a CPU, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 1330) in the form of a program module. When the instruction executed by a processor (e.g., the processor 1320), the processor may perform a function corresponding to the instruction.

The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

While the present disclosure has been described with reference to various example embodiments, the example embodiments are intended to be illustrative, not limiting. In addition, it will be understood by those of ordinary skill in the art, that various modifications, alternatives and variations may be made without departing from the true spirit and scope of the disclosure as defined by the appended claims.

What is claimed is:

1. An electronic device, comprising:
   a communication circuit including a first circuit configured to perform first communication and a second circuit configured to perform second communication;
   a processor electrically connected to the communication circuit; and
   a memory electrically connected to the processor, wherein, the memory stores instructions which, when executed by the processor, cause the processor to perform operations comprising:
controlling the first circuit to operate according to a first power control mode associated with the first communication, and controlling the second circuit to operate according to a second power control mode associated with the second communication when the first communication and the second communication are concurrently performed through the first circuit and the second circuit, wherein a period of a sleep mode in the first power control mode is different from a period of a sleep mode in the second power control mode;
identifying a first sleep period during which the first circuit operates in a sleep mode in response to operating in the first power control mode, and identifying a second sleep period during which the second circuit operates in the sleep mode in response to operating in the second power control mode;
identifying an overlap period in which the first sleep period and the second sleep period coincide; and
during the overlap period, wherein the communication circuit operates with power that is less than or equal to a predetermined power in the deep sleep mode,
wherein the operating in the deep sleep mode comprises controlling the communication circuit to operate with an amount of power smaller than a sum of an amount of power consumed by the operating according to the first power control mode and an amount of power consumed by the operating according to the second power control mode, during the deep sleep period.

2. The electronic device of claim 1, wherein the operations further comprise controlling the communication circuit so that the first communication is performed using at least some channels of a first frequency band allocated to the first circuit, and the second communication is performed using at least some channels of a second frequency band allocated to the second circuit.

3. The electronic device of claim 2, wherein, when the first frequency band and the second frequency band are the same, the operations further comprise changing one of the first frequency band allocated to the first circuit and the second frequency band allocated to the second circuit to a third frequency band that does not overlap with the first frequency band and the second frequency band.

4. The electronic device of claim 3, wherein the operations further comprise:
determining whether the first circuit or the second circuit is temporarily or continuously usable, or determining whether an external device connected through the first communication or the second communication supports the third frequency band; and
changing one of the first frequency band and the second frequency band to the third frequency band based on at least a part of the determining.

5. The electronic device of claim 2, wherein, when the first frequency band and the second frequency band are the same, the operations further comprise setting at least some channels of the first frequency band allocated to the first circuit to be different from at least some channels of the second frequency band allocated to the second circuit.

6. The electronic device of claim 1, wherein the first communication or the second communication is at least one of Wi-Fi, Wi-Fi direct, legacy Wi-Fi, and a mobile hotspot.

7. The electronic device of claim 1, wherein the operations further comprise transmitting property information associated with the first power control mode to a first external device so that the first external device connected through the first communication operates according to the first power control mode.

8. The electronic device of claim 7, wherein the property information associated with the first power control mode includes at least one of a size of an active period, a size of a sleep period, and a number of repetitions of each period.

9. The electronic device of claim 1, wherein the operations further comprise:
receiving information associated with a power control mode operating in a first external device, from the first external device connected through the first communication; and
changing the first power control mode set in the first circuit based on at least some of the received information.

10. The electronic device of claim 1, wherein the operations further comprise changing property information associated with the first power control mode or the second power control mode based on at least a comparison of communication speeds between the first communication and the second communication.

11. The electronic device of claim 1, wherein the operations further comprise:
identifying data received during the first sleep period or the second sleep period; and
controlling the first circuit and the second circuit to not operate in an active mode by being released from the first sleep period or the second sleep period, respectively, when the received data is a predetermined type of data, or an amount of received data does not exceed a predetermined amount of data.

12. The electronic device of claim 1, wherein a frequency band allocated to the first circuit and the second circuit is at least one of 2.4 GHz, 5 GHz, and 60 GHz.

13. An electronic device, comprising:
a housing:
a touch screen display exposed through a part of the housing;
a communication circuit comprising a Wi-Fi communication circuit included in the housing, the Wi-Fi communication circuit including a first circuit that supports a first frequency band and a second circuit that supports a second frequency band;
a processor electrically connected to the touch screen display and the communication circuit; and
a memory electrically connected to the processor,
wherein, the memory stores instructions which, when executed by the processor, cause the processor to perform operations comprising:
decreasing power consumption of the first circuit during a selected first period of time, using a first power saving scheme;
decreasing power consumption of the second circuit during a selected second period of time, using a second power saving scheme independently from the first power saving scheme;
identifying a first sleep period during which the first circuit operates in a sleep mode while operating in the first power saving scheme, and identifying a second sleep period during which the second circuit operates in the sleep mode while operating in the second power saving scheme;
identifying an overlap period in which the first sleep period and the second sleep period coincide; and
controlling the communication circuit to operate in a deep sleep mode during the overlap period, wherein the controlling of the communication circuit comprises, in the deep sleep mode, controlling a first decrease in power consumption of the communication circuit obtained by decreasing both the power consumption of the first circuit and the power consumption of the second circuit to be greater than a sum of a second decrease in the power consumption of the communication circuit obtained by decreasing only the power consumption of the first circuit and a third decrease in the power consumption of the communication circuit obtained by decreasing only the power consumption of the second circuit, wherein the selected first period of time in the first power saving scheme is different from the selected second period of time in the second power saving scheme.

14. The electronic device of claim 13, wherein the operations further comprise controlling the communication circuit so that first communication is performed using at least some channels of the first frequency band and second communication is performed using at least some channels of the second frequency band.

15. The electronic device of claim 14, wherein, when the first frequency band and the second frequency band are the same, the operations comprise changing one of the first frequency band allocated to the first circuit and the second frequency band allocated to the second circuit to a third frequency band that does not overlap with the first frequency band and the second frequency band.

16. The electronic device of claim 13, wherein, when the first frequency band and the second frequency band are the same, the operations further comprise setting at least some channels of the first frequency band allocated to the first circuit to be different from at least some channels of the second frequency band allocated to the second circuit.

17. The electronic device of claim 13, wherein the operations further comprise transmitting property information associated with a first power control mode to a first external device so that the first external device connected through first communication operates according to the first power saving scheme.

18. The electronic device of claim 17, wherein the property information associated with the first power control mode includes at least one of a size of an active period, a size of a sleep period, and a number of repetitions of each period, and property information associated with the first power control mode or the second power control mode is changed based on at least a comparison of communication speeds between the first communication and second communication which is supported in the second communication circuit.

19. The electronic device of claim 13, wherein the operations further comprise:

receiving information associated with a power control mode operating in a first external device, from the first external device connected through first communication; and changing the first power saving scheme in the first circuit based on at least some of the received information.

20. An electronic device, comprising:

a housing;

a touch screen display exposed through a part of the housing;

a communication circuit comprising a Wi-Fi communication circuit included in the housing, the Wi-Fi communication circuit including a first baseband circuit and a second baseband circuit;

a processor electrically connected to the touch screen display and the communication circuit; and a memory electrically connected to the processor, wherein, the memory stores instructions which, when executed by the processor, cause processor to perform operations comprising:

decreasing power consumption of the first baseband circuit during a selected period of time, using a first power saving scheme;

decreasing power consumption of the second baseband circuit during a selected period of time, using a second power saving scheme, independently from the first power saving scheme;

identifying a first sleep period during which the first baseband circuit operates in a sleep mode while operating in the first power saving scheme, and identifying a second sleep period during which the second baseband circuit operates in the sleep mode while operating in the second power saving scheme, wherein the first sleep period according to the first power saving scheme is different from the second sleep period according to the second power saving scheme;

identifying an overlap period in which the first sleep period and the second sleep period coincide; and controlling the communication circuit to operate in a deep sleep mode during the overlap period, wherein the operating in the deep sleep mode comprises controlling the communication circuit to operate with an amount of power smaller than a sum of an amount of power consumed by the operating according to the first power saving scheme and an amount of power consumed by the operating according to the second power saving scheme, in the deep sleep mode.

* * * * *